US010098053B2

(12) United States Patent
Sherman

(10) Patent No.: US 10,098,053 B2
(45) Date of Patent: *Oct. 9, 2018

(54) IP BASED CELLULAR COMMUNICATION SYSTEM UTILIZING ADVANCED TUNNELS AND ENCAPSULATION METHODS USEFUL IN CONJUNCTION THEREWITH

(71) Applicant: ELTA SYSTEMS LTD., Ashdod (IL)

(72) Inventor: Itay Sherman, Hod Hasharon (IL)

(73) Assignee: ELTA SYSTEMS LTD., Ashdod (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/497,808

(22) Filed: Jul. 5, 2017

(65) Prior Publication Data

US 2017/0295535 A1 Oct. 12, 2017

Related U.S. Application Data

(63) Continuation of application No. 14/004,310, filed as application No. PCT/IL2012/050078 on Mar. 8, 2012, now Pat. No. 9,668,195.

(Continued)

(51) Int. Cl.
*H04B 7/14* (2006.01)
*H04J 1/10* (2006.01)
(Continued)

(52) U.S. Cl.
CPC ......... *H04W 40/22* (2013.01); *H04L 61/2517* (2013.01); *H04L 2212/00* (2013.01); *H04W 84/045* (2013.01)

(58) Field of Classification Search
CPC . H04B 7/15542; H04B 7/2606; H04W 40/22; H04W 72/00; H04W 72/0453; H04W 40/00; H04W 84/047; H04W 84/005; H04W 80/04; H04W 88/08; H04W 8/26; H04W 72/02; H04W 28/0215; H04W 36/04; H04W 4/22

See application file for complete search history.

(56) References Cited

U.S. PATENT DOCUMENTS 5,657,317 A 8/1997 Mahany et al.
6,973,057 B1 12/2005 Forslow
(Continued)

FOREIGN PATENT DOCUMENTS

CN 101523818 A 9/2009
EP 0 615 391 A1 9/1994
(Continued)

OTHER PUBLICATIONS

Alnajjar, Fuad et al. "SNR/RP Aware Routing Algorithm Cross-Layer Design for Manet". IJWMN, vol. 1, No. 2, Nov. 2009.
(Continued)

*Primary Examiner* — Yemane Mesfin
*Assistant Examiner* — Abdelillah Elmejjarmi
(74) *Attorney, Agent, or Firm* — Oliff PLC

(57) ABSTRACT

A dynamic hierarchical cellular system implementing multi-hop encapsulation, wherein in at least one message destined for an individual base station functionality, the individual base station functionality's header is encapsulated within an individual mobile station functionality's header, so as to allow said message to be routed by said router to the individual base station functionality, via the individual mobile station functionality.

29 Claims, 13 Drawing Sheets

Related U.S. Application Data

(60) Provisional application No. 61/451,339, filed on Mar. 10, 2011.

(51) Int. Cl.
*H04J 3/08* (2006.01)
*H04W 40/22* (2009.01)
*H04L 29/12* (2006.01)
*H04W 84/04* (2009.01)

(56) References Cited

U.S. PATENT DOCUMENTS

| | | |
|---|---|---|
| 8,340,076 B2 | 12/2012 | Jetcheva et al. |
| 8,396,048 B2 | 3/2013 | Yamane |
| 2006/0159088 A1 | 7/2006 | Aghvami et al. |
| 2007/0115935 A1 | 5/2007 | Qiu et al. |
| 2008/0045215 A1 | 2/2008 | Chen et al. |
| 2008/0090575 A1 | 4/2008 | Barak et al. |
| 2008/0181178 A1 | 7/2008 | Shaheen |
| 2009/0213762 A1 | 8/2009 | Guo et al. |
| 2010/0177674 A1 | 7/2010 | Aggarwal |
| 2010/0260109 A1 | 10/2010 | Ulupinar et al. |
| 2011/0081903 A1 | 4/2011 | Cai et al. |
| 2011/0182253 A1 | 7/2011 | Shekalim |
| 2012/0231797 A1 | 9/2012 | Van Phan et al. |
| 2013/0016668 A1 | 1/2013 | Zhao et al. |

FOREIGN PATENT DOCUMENTS

| | | |
|---|---|---|
| WO | 2008/0046089 A2 | 4/2008 |
| WO | 2009/134178 A1 | 11/2009 |
| WO | 2010/0006212 A2 | 1/2010 |
| WO | 2011/092698 A1 | 8/2011 |
| WO | 2012/070044 A1 | 5/2012 |
| WO | 2012/070045 A2 | 5/2012 |
| WO | 2012/070048 A1 | 5/2012 |
| WO | 2012/070049 A1 | 5/2012 |

OTHER PUBLICATIONS

Teyeb, Oumer et al. "Dynamic Relaying in 3GPP LTE-Advanced Networks". Eurasip Journal on Wireless Communications and Networking, vol. 2009, Article ID 7311317, Jan. 2009, pp. 1-11.

Sharp: "Information Exchange Over a Wireless X2 Interface Between Relay Nodes". 3GPP FRAFT; R2-092827, 3rd Generation Partnership Project (3PP), Apr. 2009.

Yamkomeroglu, Halim. "Fixed and Mobile Relaying Technologies for Cellular Networks". 2nd Workshop in Applications and Serivces in Wireless Networks (ASWN/02), pp. 75-81, Berlin, Germany, Jul. 2002.

Multicast-Broadcast Single-Frequency Network. https://en.wikipedia.org/w/index.php?title=Multicast-broadcast_single-frequency_network&oldid=474160489. Jan. 31, 2012.

Multimedia Broadcast Multicast Service. http://en.wikipedia.org/w/index.php?title=Multimedia_Broadcast_Multicast_Service&oldid=462172966. Nov. 23, 2011.

The Mobile Broadband Standard. http://www.3gpp.org/specifications, Mar. 27, 2014.

"3rd Generation Partnership Project; Technical Specification Group Radio Access Network; Evolved Universal Terrestrial Radio Access (E-UTRA); Relay Architectures for E-UTRA (LTE-Advanced) (Release 9)". 3GPP Standard; 3GPP TR 36.806. V. 0.3.1, Feb. 2010.

Soliman, Hesham et al. "Hierarchical Mobil IPv6 (HMIPv6) Mobility Management". Internet Engineering Task Force, pp. 1-25, Oct. 2008.

IP BASED CELLULAR COMMUNICATION SYSTEM UTILIZING ADVANCED TUNNELS AND ENCAPSULATION METHODS USEFUL IN CONJUNCTION THEREWITH

REFERENCE TO CO-PENDING APPLICATIONS

This is a Continuation of U.S. application Ser. No. 14/004,310 filed Sep. 10, 2013, which is a National Phase Entry of International Application No. PCT/IL2012/050078 filed Mar. 8, 2012, which claims priority to U.S. Provisional Application No. 61/451,339 filed Mar. 10, 2011, and Israel Patent Application No. 218046 filed Feb. 12, 2012. The disclosures of the prior applications are hereby incorporated by reference herein in their entirety.

FIELD OF THIS DISCLOSURE

This invention relates to architecture and data transmission methods for use in hierarchal cellular networks.

BACKGROUND

A classical cellular network includes or consists of core segment and Radio Access Network (RAN). The Radio Access Network (RAN) is comprised of base stations (BS) and mobile stations (MS). Each of the Mobile Stations is typically connected to one of the Base Stations (FIG. 2).

A hierarchal cellular network (FIG. 1a) comprises a classical cellular network, however the Radio Access Network (RAN) segment enables direct connection between Base Stations so that one Base Station is capable of relaying the traffic of the other Base Stations to the core segment or to other Base Stations in a higher layer, which is connected to the core segment.

Multi-layer hierarchical dynamic cellular networks pose difficulties for traffic flow and management (e.g. the multi protocol-layers handling). These difficulties may occur since the base LTE protocols and core elements do not support this type of network topology.

The disclosures of all publications, including patent documents and protocols of standards mentioned in the specification, and of the publications and patent documents and standards cited therein directly or indirectly, are hereby incorporated by reference.

SUMMARY

Certain embodiments of the presently disclosed subject matter seek to provide a IP based cellular communication system utilizing tunnels.

A classical cellular network consists of or comprises a core segment and Radio Access Network (RAN). The RAN typically comprises base stations (BS) and mobile stations (MS). Each of the mobile station is typically connected to one of the base station (FIG. 1).

A hierarchal cellular network (FIG. 2) typically comprises a classical cellular network, however the RAN segment enables direct connection between base stations such that one base station is capable of relaying the traffic of the other base station to the core segment or to other base station in a higher layer that is connected to the core segment, etc.

Multi-layer hierarchical dynamic cellular networks pose difficulties for traffic flow and management since the base LTE protocols and core elements do not support this type of network topology.

Certain embodiments of the present invention seek to provide a method for creating a layered hierarchical cellular network while using standard core elements.

Certain embodiments of the present invention seek to provide a relay station that comprises a standard base station and several mobile handsets that serve as a mobile back-hauling link.

Certain embodiments of the present invention seek to provide data forwarding capabilities of such a relay station and how these facilitate transfer of data across multiple relays via standard core elements.

In accordance with an aspect of the presently disclosed subject matter, there is provided an IP based cellular communication system comprising an IP connectivity gateway coupled to a network router and to a mobility management entity; the mobility management entity (e.g. MME) is configured to store at least (a) IP addresses of a plurality of stationary relays (b) IP addresses of mobile relays and the IP address of a linked relay that each individual mobile relay is anchored to (c), IP addresses of mobile stations and the IP address of a linked relay that each individual mobile station is anchored to; a router for routing from the gateway packets having an IP address of any one of the stationary relays; and re-routing to the gateway packets designated to an IP address of one of the moving relays or mobile stations; the system comprising:
 (i) the connectivity gateway communicating with the mobility management entity (MME) for obtaining an IP address of a linked relay of a target mobile station;
 (ii) the connectivity gateway transmitting through the router a "tunnel setting packet" having the IP address of the linked relay and in the case that the linked relay having an IP address of any of the stationary relays, the router routing the packet, resulting in setting a tunnel from the gateway to the stationary relay;
 (iii) otherwise the linked relay does not match a stationary relay and in response the router re-routing the packet to the gateway and consequently repeatedly performing (i) to (iii) as many times as required for obtaining in each cycle another linked relay of a linked relay obtained in the previous cycle; the linked relays constituting a succession of linked relays, whereby a first tunnel segment is set from the gateway to the matched stationary relay
 (iv) the gateway setting a set of tunnels including
  (a) the first tunnel segment
  (b) a succession of tunnels each commencing from the gateway and ending in a respective linked relay of the succession of linked relays.

In accordance with an embodiment of the presently disclosed subject matter, there is further provided a method, wherein the IP connectivity gateway being a P/S gateway operative in a LTE communication network.

In accordance with an aspect of the presently disclosed subject matter, there is yet further provided a method, wherein the IP connectivity gateway being a Connectivity Service Network (CSN) module, operative in a Wimax communication network.

In accordance with an embodiment of the presently disclosed subject matter, there is yet further provided a method, wherein the method further comprises downlinking a message through the gateway to the target mobile device utilizing each tunnel in the set of tunnels including
 (a) the first tunnel segment
 (b) the succession of tunnels each commencing from the gateway and ending at a respective linked relay of the succession of linked relays.

In accordance with an embodiment of the presently disclosed subject matter, there is yet further provided a method, wherein the method further comprises uplinking a message from the target mobile device through the gateway, utilizing each tunnel in the set of tunnels including
(a) the first tunnel segment
(b) the succession of tunnels each commencing from the gateway and ending in a respective linked relay of the succession of linked relays.

The present invention also typically includes at least the following embodiments:

Embodiment 1

In an IP based cellular communication network comprising a plurality of stationary relays, a system comprising:
an IP connectivity gateway coupled to a network router and to a mobility management entity;
and a router for routing, from the gateway, packets whose IP address is any one of the plurality of stationary relays to said stationary relays; and routing to said gateway, at least one packet designated to an IP address of at least one of: a moving relay and a mobile station.

Embodiment 2

The method according to Embodiment 1, wherein said IP connectivity gateway comprises a P/S-Gateway operative in a LTE communication network.

Embodiment 3

The method according to Embodiment 1, wherein said IP connectivity gateway comprises some of: Connectivity Service Network (CSN) module and Access Service Network (APN), operative in a WiMax communication network.

Embodiment 4

The system according to Embodiment 1 and also comprising an MME configured to store at least (i) IP addresses of plurality stationary relays (ii) IP addresses of mobile relays and the IP address of a linked relay that each individual mobile relay is anchored to (iii) IP addresses of mobile stations and the IP address of a linked relay that each individual mobile station is anchored to.

Embodiment 5

The system according to Embodiment 4 and wherein
(i) the connectivity gateway communicates with said MME for obtaining an IP address of a linked relay of a target mobile station;
(ii) the connectivity gateway transmits through said router a "tunnel setting packet" having the IP address of said linked relay;
(iii) if said linked relay has an IP address of any of said stationary relays, said router routes said packet, resulting in setting a tunnel from said gateway to said stationary relay;
(iv) otherwise said linked relay does not match a stationary relay and in response said router is operative for routing said packet to said gateway and repeatedly performing (i)-(iii) at least one time for obtaining in each cycle another linked relay of a linked relay obtained in the previous cycle; said linked relays constituting a succession of linked relays, wherein a first tunnel segment is set from said gateway to said matched stationary relay, the gateway setting a set of tunnels including
(a) said first tunnel segment; and
(b) a succession of tunnels each commencing from said gateway and ending at a respective linked relay of said succession of linked relays.

Embodiment 6

The system according to embodiment 1 wherein packets are bounced back to the IP connectivity gateway by the router.

Embodiment 7

The system according to embodiment 1 wherein packets are bounced back to the gateway (e.g. P/S-GW) internally in the IP connectivity gateway by virtue of the IP connectivity gateway recognizing a destination IP address as its own address.

Embodiment 8

A dynamic hierarchical cellular system implementing multi-hop encapsulation, the system comprising:
a core including an mobility management entity and an IP connectivity gateway interfacing therewith,
at least one static base station coupled to the mobility management entity and the IP connectivity gateway in the core,
at least one individual moving relay coupled to at least one individual static base station and including a mobile station functionality and a base station functionality; and
at least one mobile station coupled to at least one of the static base station and the moving relay;
wherein the core comprises an encapsulating router, whose routing operations encapsulate messages to and from said at least one mobile station, wherein the encapsulating router is coupled to the IP connectivity gateway, to the mobility management entity and to the individual static base station via which the individual moving relay connects to the core.

Embodiment 9

The system according to Embodiment 8 wherein the router is operative to route IP-packets arriving from a source external to the core.

Embodiment 10

The system according to Embodiment 8 wherein the router is operative to route IP-packets arriving from at least one static base station under said core.

Embodiment 11

The system according to Embodiment 8 wherein the router is operative to route IP-packets arriving from an IP connectivity gateway within said core.

Embodiment 12

The system according to Embodiment 8 wherein if an IP address of a destination in a header of a packet indicates one of a mobile station destination and a relay destination, the router routes said packet to the IP connectivity gateway whereas if an IP address of a destination in a header of a packet indicates a static base station, the router routes the packet to the static base station.

Embodiment 13

The system according to Embodiment 8 wherein at least one pair of IP addresses of at least one mobile station functionality and base station functionality have a common portion which is recognized by said router.

Embodiment 14

The system according to Embodiment 13 wherein at least one pair of IP addresses of at least one mobile station functionality and its co-located base station functionality have a common portion unique to said pair which is recognized by said router.

Embodiment 15

The system according to Embodiment 13 wherein if the router identifies at least a portion of a packet's IP-address which represents both mobile station functionality and base station functionality, the packet is sent to the IP connectivity gateway.

Embodiment 16

The system according to Embodiment 13 wherein the core is configured to assign IP addresses such that at least one pair of IP addresses of at least one mobile station functionality and at least one base station functionality have a common portion.

Embodiment 17

The system according to Embodiment 16 wherein the core is configured manually.

Embodiment 18

The system according to Embodiment 16 wherein the core is configured via an application.

Embodiment 19

The system according to Embodiment 8 wherein all mobile station functionalities served by the core have IP addresses with a common portion which is recognized by said router.

Embodiment 20

The system according to Embodiment 8 wherein the core is configured to assign identical IP addresses to at least one base station functionality and at least one mobile station functionality but to assign first and second different ports to said at least one base station functionality and at least one mobile station functionality respectively.

Embodiment 21

The system according to Embodiment 20 which operates within a IP-version 4 (IPv4) protocol.

Embodiment 22

The system according to Embodiment 8 wherein at least one pair of IP addresses of a base station functionality and mobile station functionality respectively includes a first portion, common to both IP addresses in the pair, common to said base station functionality and mobile station functionality and a second portion, which differs between the IP addresses in the pair and represents uniqueness of each of said base station functionality and mobile station functionality respectively.

Embodiment 23

The system according to Embodiment 22 which operates within a IP-version 6 (IPv6) protocol.

Embodiment 24

The system according to Embodiment 8 and also comprising an additional router in the relay which upon receipt of a message from a co-located base station functionality, sends to the additional encapsulating router in the core said message with a header indicating that the message was sent by said additional router.

Embodiment 25

The system according to Embodiment 24 wherein said additional router comprises a separate logical router application residing also on the encapsulating router.

Embodiment 26

The system according to Embodiment 24 wherein when said message with a header is received by said encapsulating router, said encapsulating router removes said header to reveal the message as received from the base station functionality co-located with the additional router.

Embodiment 27

The system according to Embodiment 8 wherein said router is operative to route information to at least one base station functionality, via at least one mobile station functionality.

Embodiment 28

The system according to Embodiment 8 wherein the router cooperates with a logical table in the mobility management entity which indicates which base station serves each mobile station.

Embodiment 29

The system according to Embodiment 8 wherein as each individual relay enters a network served by the core, the individual relay's mobile station functionality is assigned an IP address which the router is pre-configured to identify as an IP address of the individual relay's base station functionality.

Embodiment 30

The system according to Embodiment 29 wherein the router is pre-configured to identify an individual relay's base station functionality using a predetermined portion of at least one IP address.

Embodiment 31

The system according to Embodiment 8 wherein the core having a core network and wherein all mobile station functionalities in relays served by said core form a subnet of the core network.

Embodiment 32

The system according to Embodiment 31 wherein all base station functionalities in relays served by said core are also members of said subnet of the core network.

Embodiment 33

The system according to Embodiment 8 wherein the core having a core network and wherein all base station functionalities in relays served by said core form a subnet of the core network.

Embodiment 34

The system according to Embodiment 33 wherein all base station functionalities in relays served by said core form a first subnet of the core network and all mobile station functionalities in relays served by said core form a second subnet of the core network which differs from said first subnet.

Embodiment 35

The system according to Embodiment 24 wherein at least one moving relay has a relay resource manager operative, when the moving relay joins a network served by the core, to instruct the additional router to store an association between the moving relay's base station functionality and the moving relay's co-located mobile station functionality.

Embodiment 36

The system according to Embodiment 27 wherein in at least one message destined for an individual base station functionality, the individual base station functionality's header is encapsulated within an individual mobile station functionality's header, so as to allow said message to be routed by said router to the individual base station functionality, via the individual mobile station functionality.

Embodiment 37

The system according to Embodiment 8 wherein said at least one static base station comprises more than one stationary base station.

Embodiment 38

The system according to Embodiment 8 wherein said router at least one of: a physical hardware entity; and a router service application residing on a computer housing the gateway.

Embodiment 39

The system according to Embodiment 9 wherein said source comprises at least one of: a video server, a voice calls server, a gaming server, other cellular network; and an external network.

Embodiment 40

The system according to Embodiment 5, wherein a message is down-streamed through said gateway to said target mobile device utilizing each tunnel in the set of tunnels including
(a) said first tunnel segment
(b) the succession of tunnels each commencing from said gateway and ending at a respective linked relay of said succession of linked relays.

Embodiment 41

The system according to Embodiment 5, wherein a message is up-streamed from said target mobile device through said gateway, utilizing each tunnel in the set of tunnels including
(a) said first tunnel segment
(b) the succession of tunnels each commencing from said gateway and ending at a respective linked relay of said succession of linked relays.

Embodiment 42

The system according to Embodiment 1, wherein said IP connectivity gateway comprises some of: GGSN and SGSN, operative in a 3G communication network.

Embodiment 43

The system according to Embodiment 8 wherein said IP connectivity gateway interfacing therewith comprises one of: an IP-connectivity GW in LTE; one of a P-Gateway, S-Gateway, P/S-Gateway and Access-Gateway in 3G GGSN, an SGSN in WiMAX, and an ASN-Gateway in CSN.

Embodiment 44

The system according to Embodiment 8 wherein the core is static.

Embodiment 45

The system according to Embodiment 8 wherein the router is operative to route IP-packets arriving from an mobility management entity within said core.

Embodiment 46

The system according to Embodiment 8 wherein all base station functionalities' IP addresses have a common portion which is recognized by said router.

Embodiment 47

The system according to Embodiment 28 wherein the router receives information from said table, and is operative to insert new information to said table according to a desired relay network topology.

Embodiment 48

The system according to Embodiment 24 wherein said additional router at least one of: a physical hardware entity; and a router service application.

Embodiment 49

The system according to Embodiment 24 wherein said encapsulating router at least one of: a physical hardware entity; and a router service application.

Embodiment 50

The system according to Embodiment 1 and wherein at least one of said plurality of stationary relays resides in a static base station.

Embodiment 51

The system according to Embodiment 8 wherein said mobility management entity comprises one of: an LTE MME, a 3G RNC, and a WiMAX ASN.

Embodiment 52

A method corresponding to any of the above.

Also provided is a computer program comprising computer program code means for performing any of the methods shown and described herein when said program is run on a computer; and a computer program product, comprising a typically non-transitory computer-usable or -readable medium or computer readable storage medium, typically tangible, having a computer readable program code embodied therein, said computer readable program code adapted to be executed to implement any or all of the methods shown and described herein. It is appreciated that any or all of the computational steps shown and described herein may be computer-implemented. The operations in accordance with the teachings herein may be performed by a computer specially constructed for the desired purposes or by a general purpose computer specially configured for the desired purpose by a computer program stored in a typically non-transitory computer readable storage medium.

Any suitable processor, display and input means may be used to process, display e.g. on a computer screen or other computer output device, store, and accept information such as information used by or generated by any of the methods and apparatus shown and described herein; the above processor, display and input means including computer programs, in accordance with some or all of the embodiments of the present invention. Any or all functionalities of the invention shown and described herein, such as but not limited to steps of flowcharts, may be performed by a conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, magnetic-optical discs or other discs; RAMs, ROMs, EPROMs, EEPROMs, magnetic or optical or other cards, for storing, and keyboard or mouse for accepting. The term "process" as used above is intended to include any type of computation or manipulation or transformation of data represented as physical, e.g. electronic, phenomena which may occur or reside e.g. within registers and/or memories of a computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor may be employed to compute or generate information as described herein e.g. by providing one or more modules in the processor to perform functionalities described herein. Any suitable computerized data storage e.g. computer memory may be used to store information received by or generated by the systems shown and described herein. Functionalities shown and described herein may be divided between a server computer and a plurality of client computers. These or any other computerized components shown and described herein may communicate between themselves via a suitable computer network.

The following terms may be construed either in accordance with any definition thereof appearing in the prior art literature or in accordance with the specification, or as follows:

access link: a bi-directional link between a relay node (RN) base station functionality and a mobile station (MS) served thereby or between a base station and a mobile station served thereby. It typically has an uplink portion and a downlink portion, both uni-directional.

Backhaul data: data being transferred, typically bi-directionally, over at least one backhauling link.

Backhauling link: bi-directional link other than an access link e.g. link between relays in adjacent levels or link between relay and static base station or link between relays and relay proxy or link between base station functionality or static base station or relay proxy and core. More generally, a backhauling link bi-directionally links distributed sites to each other or links access points e.g. base stations and a more centralized point e.g. a core. Typically a backhauling link has an uplink portion and a downlink portion, both uni-directional.

base station: one of a plurality of stationary (=static) or mobile nodes in a cellular communication network which are sufficiently densely distributed over a served area such that almost all mobile communication devices served by the network can almost always communicate with one another or with a terrestrial network through those nodes, typically including allowing users of such devices to converse and/or exchange digital information between them or with a terrestrial network, via communication paths defined between respective pairs of base stations and mobile communication devices.

base station functionality or TeNB: functionality, typically software implemented, residing on a relay which communicates with an antenna, transmitter and receiver to enable the relay to function as a base station, e.g. to converse and/or exchange digital information between them or with a terrestrial network, via communication paths defined between respective pairs of base stations and mobile communication devices.

bi-directional link: a link between levels of a hierarchical communication network which includes both an uplink and a downlink. For example, in FIG. 3, links 01 and 03 are bi-directional.

cell: base station.

core: server in a cellular communication system that: (1) connects between mobile stations that are attached to the same core; and/or (2) connects between mobile stations that are attached to one core with mobile stations that are attached to a different core; and/or (3) connects mobile stations attached to the core to other servers such as Internet server, terrestrial communication network servers, video servers, gaming servers (not shown).

Core Network: synonym for "core" or core plus network linked thereto.

Ctrl: e.g. as per LTE protocol.

donor: serving relationship e.g. a base station serving e.g. a relay node.

Downlink (DL): a uni-directional portion of a link e.g. backhauling or access link from a relay's base station functionality or static base station to a mobile station functionality or mobile station.

DL UE or Downlink (DL) UE: downlink to a user entity via a sequence of at least one relay e.g. as shown in FIG. 3.

down-stream (DS): flow of data from a higher point at the topology (closer to the core) to a lower point at the topology (further from the core).

eNB: base station, or base station functionality e.g. in a relay, which uses LTE protocol. Also termed herein "LTE base station".

GTP: a group of IP-based communications protocols used to carry General Packet Radio Service (GPRS) within GSM, UMTS and LTE networks.

GTP bearer: A bearer using a GTP protocol.

GTP tunnel: A tunnel using a GTP protocol.

Link: Telecommunications or radio link between nodes of a communication network. It is appreciated that a portion, typically uni-directional, of a typically bi-directional link is also sometimes termed a link. There may be one or more channels in a link, e.g. in LTE all the following channels are uplinks: PUCCH, PUSCH, PRACH.

MBSFN: A non-limiting example of a Downlink (DL)-only transmission protocol. According to Wikipedia, Multicast-Broadcast Single Frequency Network is a communication channel defined in LTE, the fourth-generation cellular networking standard, which may deliver services such as mobile TV using the LTE infrastructure. This enables network operators to offer mobile TV without the need for additional costly licensed spectrum and without requiring new infrastructure and end-user devices. There is no known commercial deployment of MBSFN.

According to Wikipedia, LTE's Enhanced Multimedia Broadcast Multicast Services (E-MBMS) provide transport features for sending the same content information to all the users in a cell (broadcast) or to a given set of users (subscribers) in a cell (multicast). In contrast, IP-level broadcast or multicast offer no sharing of resources on the radio access level. In E-MBMS it is possible to either use a single eNode-B or multiple eNode-Bs for transmission to multiple LTE mobile station (UE)s. MBSFN is the definition for the latter option.

According to Wikipedia, MBSFN is a transmission mode which exploits LTE's OFDM radio interface to send multicast or broadcast data as a multicell transmission over a synchronized single-frequency network (SFN). The transmissions from the multiple cells are sufficiently tightly synchronized for each to arrive at the LTE mobile station (UE) within the OFDM Cyclic Prefix (CP) so as to avoid Inter-Symbol Interference (ISI). In effect, this makes the MBSFN transmission appear to a LTE mobile station (UE) as a transmission from a single large cell, dramatically increasing the Signal-to-Interference Ratio (SIR) due to the absence of inter-cell interference [4].

MBMS: Multimedia Broadcast Multicast Service including some or all of the technology described in 3GPP TS 25.346.

mobile station or mobile communication device: a portable electronic device which communicates with other such devices or with a terrestrial network via a cellular communication network, typically including allowing users of such devices to converse and/or exchange digital information between them. The device may even comprise a dongle connected to a computer or sensor with no user nearby.

mobile station functionality or tUE or TUE: functionality, typically software implemented, residing on a relay which communicates with an antenna, transmitter and receiver to enable the relay to function as a mobile communication device. The mobile station functionality typically includes antenna, RF front-end, Modem (communications processor) but does not necessarily include an application processor nor appliances such as keyboard, screen, microphone, and speaker which serve a conventional mobile station.

Radio bearer, bearer: e.g. as per 3GPP terminology.

RE resource block: e.g. as per LTE standard or an adaptation thereof suitable for operation within communication standards other than LTE.

relay: a node in the cellular communication network equipped with an antenna, transmitter and receiver and functioning both as a mobile communication device and a base station and extending the coverage of the base-stations.

Relay link: link or radio segment between a relay node and a donor base station.

Segment: link.

SeNB: stationary base station

Subframe: e.g. as per LTE protocol

Trans. Downlink (DL) backhauling: transmit backhauling using downlink.

Tunnel: as per protocols that enables tunneling such as but not limited to GRE and GPRS.

UE: user entity or mobile station or mobile communication device or mobile station functionality. e.g. in a relay, which uses LTE protocol. Also termed herein "LTE mobile station".

Uplink (UL): a uni-directional portion of a pair of links e.g. of backhauling or access links, from a relay's mobile station functionality or mobile device to a relay's base station functionality or static base station.

Uplink backhaul data: data being transferred uni-directionally, over only the uplink portion of at least one backhauling link, typically from a base station to a core or more generally from an access point to a more centralized point.

upstream (US): flow of data from a lower point in a network topology (i.e. further from the core) to a higher point in a network topology (i.e. closer to the core).

BRIEF DESCRIPTION OF THE DRAWINGS

Certain embodiments of the present invention are illustrated in the following drawings.

Computational components described and illustrated herein can be implemented in various forms, for example, as hardware circuits such as but not limited to custom VLSI circuits or gate arrays or programmable hardware devices such as but not limited to FPGAs, or as software program code stored on at least one intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Data can be stored on one or more intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any time of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Figure 1:
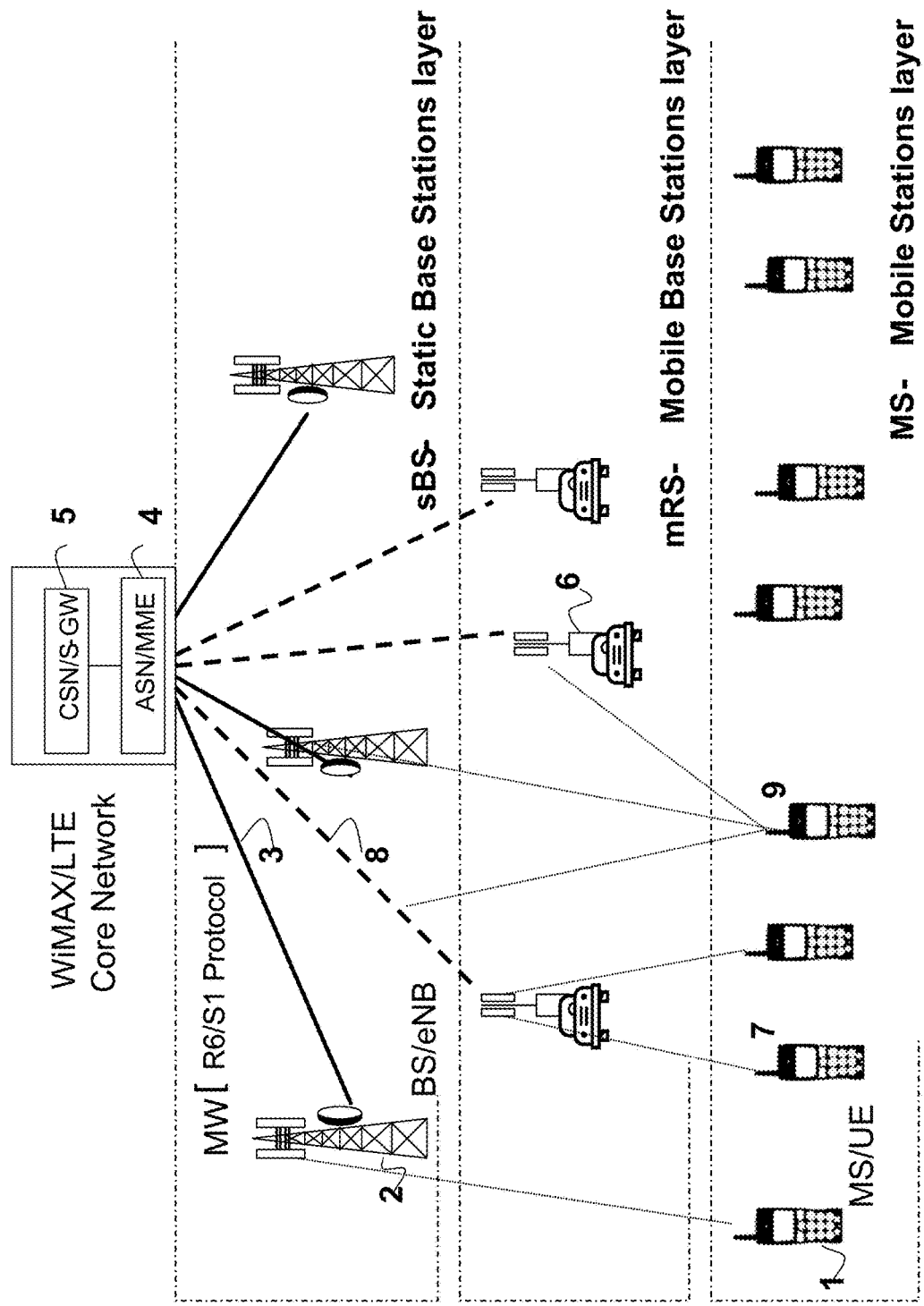
FIG. 1 describes a prior art cellular network that includes multiple mobile and static base stations that are all connected directly to the core network.

Reference is made to FIG. 1 which illustrates a prior art cellular network that includes multiple mobile and static base stations that are all connected directly to the core network.

Architecture and methods are now described which are operative to transfer control and traffic information between each one of the mobile stations (MS), through any static or dynamic hierarchical cellular topology to any destination (that may be a Mobile Station in the same network or any destination outside the network). A solution for the 4G 3GPP cellular network, also known as LTE (Long Term Evolution) is described, but the same principles may be applied to any hierarchical cellular network (e.g. based on 2G, 3G, WiMAX, WiFi).

Operation of a cellular communication system that utilizes moving relays as well as a hierarchical cellular network is described in PCT Application No. PCT/IL2011/000096 entitled "Cellular communication system with moving base stations and methods and apparatus useful in conjunction therewith" filed on Jan. 27, 2011 published as Published PCT Application No. WO/2011/092698. The following embodiments inter alia are known in the art by virtue of being described in the above publication:

Embodiment 1

A moving cellular communication system comprising:
a plurality of moving relays each including base station functionality, a radio manager and mobile station functionality, all co-located,
wherein each base station functionality is operative to communicate via antennae with at least one mobile station thereby to define a first radio link there between, and wherein each base station functionality has a physical connection to its co-located radio manager,
wherein each mobile station functionality communicates via antennae with a unit which has base station functionality thereby to define a second radio link,
wherein the radio manager in each individual moving relay comprises:
a radio resource manager; and
functionality for exchanging information with radio managers included in moving relays other than said individual moving relay,
wherein said information is used by said radio resource manager to select, for at least one individual mobile station seeking to be served, one of:
a static base station; and
a base station functionality,
to which to connect said individual mobile station in order to provide cellular communication services thereto.

Embodiment 2

A system according to embodiment 1 operative in conjunction with a cellular network including a core device, at least one static base station, and a population of mobile stations communicating via antennae with at least one of the base stations, wherein at least one topological change in said system occurs dynamically, said topological change comprises a dynamic change in at least one connection between a moving relay and at least one of a moving relay and a static base station.

Embodiment 3

A system according to embodiment 2 wherein at least one radio resource manager locally stores at least some of the information it uses to make a decision regarding selection of a cellular communication service provider for an individual mobile station seeking to be served, even after said decision has been made, thereby to generate a database co-located with said radio resource manager.

Embodiment 4

A system according to embodiment 1 wherein said information used by said radio resource manager includes information obtained from its co-located base station functionality.

Embodiment 5

A system according to embodiment 1 or embodiment 4 wherein said information used by said radio resource manager includes information obtained from its co-located mobile station functionality.

Embodiment 6

A system according to embodiment 5 wherein said information obtained from said co-located mobile station functionality is derived from at least one measurement of at least one characteristic of said second radio link.

Embodiment 7

A system according to embodiment 6 wherein said functionalities are provided in accordance with a cellular communication standard and wherein said information includes information provided by said mobile station functionality in accordance with said standard.

Embodiment 8

A system according to embodiment 7 wherein said cellular communication standard comprises 3GPP E-UTRAN LTE.

Embodiment 9

A system according to embodiment 8, where the information includes at least one of RSSI, RSRP, RSRQ.

Embodiment 10

A system according to embodiment 1 wherein each said moving relay and each said mobile station constitutes a cellular communication node and wherein said links generate routes interconnecting said nodes and wherein at least one radio resource manager residing at an individual node is operative to compute a route quality parameter characterizing quality of at least one individual route passing through said individual node, by combining information pertaining to links along said individual route.

Embodiment 11

A system according to embodiment 10 wherein said radio resource manager operative to compute a route quality parameter combines information pertaining to links along said individual route by computing a minimum from among values characterizing respective qualities of all links forming said individual route.

Embodiment 12

A system according to embodiment 10 wherein said system is operative in conjunction with a cellular network including a core device, at least one static base station, and a population of mobile stations communicating via antennae with at least one of the base stations, and wherein said individual route comprises a route connecting said individual node to at least one of the static base stations.

Embodiment 13

A system according to embodiment 1 wherein said system is operative in conjunction with a static network including a core device, at least one static base station, and a population of mobile stations communicating via antennae with at least one of the base stations and wherein each individual radio manager that does not have a sufficiently high quality connection to the static network may provide communication, via said individual radio manager's co-located base station functionality, between mobile stations that are connected to said co-located base station functionality.

Embodiment 14

A system according to embodiment 13 wherein said system is operative in conjunction with a static network including a core device, at least one static base station, and a population of mobile stations communicating via antennae with at least one of the base stations and wherein each radio manager that does not have a connection to the static network may provide communication, via said individual radio manager's co-located base station functionality, between mobile stations that are connected to said co-located base station functionality.

Embodiment 15

A system according to embodiment 1 wherein at least one individual radio manager can provide communication, via at least one base station functionality linked to said radio manager, between mobile stations that are connected to said at least one base station functionality.

Embodiment 16

A system according to embodiment 1 wherein each resource manager is operative to selectably establish communication between at least one mobile station connected to its co-located base station functionality and at least one mobile station connected to a moving relay to which said resource manager's co-located mobile station functionality is linked via a route.

Embodiment 17

A system according to embodiment 16 wherein said route includes a plurality of links.

Embodiment 18

A system according to embodiment 10 wherein said radio resource manager residing at said individual node computes a plurality of route quality parameters for a corresponding plurality of route alternatives.

Embodiment 19

A system according to embodiment 18 wherein said radio resource manager provides said plurality of route quality parameters to an individual mobile station connected to the base station functionality co-located with said radio resource manager.

Embodiment 20

A system according to embodiment 19 wherein said individual mobile station is operative, when in a mode in which it is its own decision to which unit having base station functionality it is to be connected, to make said decision based at least in part on said plurality of route quality parameters.

Embodiment 21

A system according to embodiment 6 wherein said information obtained from said co-located mobile station functionality includes said at least one measurement itself.

Embodiment 22

A system according to embodiment 4 wherein said information obtained from said co-located base station functionality is derived from at least one measurement of at least one characteristic of said first radio link.

Embodiment 23

A system according to embodiment 22 wherein said information obtained from said co-located base station functionality includes said at least one measurement itself.

Embodiment 24

A system according to embodiment 8 or embodiment 9 where the information includes a rsSINR (reference signal SINR) metric.

Embodiment 25

A system according to embodiment 1 in which an individual mobile station is connected to an individual base station functionality and wherein a decision to transfer said individual mobile station away from said individual base station functionality is made by a resource manager co-located with said individual base station functionality.

Embodiment 26

A system according to embodiment 1 and also comprising a cellular network including a core device, at least one static base station, and a population of mobile stations communicating via antennae with at least one of the base stations.

Embodiment 27

A system according to embodiment 26 and also comprising a relay network manager (DisNetRM) located at a static network core device.

Embodiment 28

A system according to embodiment 1 wherein, for at least one mobile station functionality in at least one individual moving relay, said unit which has base station functionality comprises a base station functionality of a moving relay other than said individual moving relay.

Embodiment 29

A system according to embodiment 1 operative in conjunction with a cellular network including a core device, at least one static base station, and a population of mobile stations communicating via antennae with at least one of the base stations, wherein, for at least one mobile station functionality in at least one individual moving relay, said unit which has base station functionality comprises said static base station.

Embodiment 30

A system according to embodiment 1 wherein said information, but for said exchanging, is accessible to only a subset of said radio managers.

Embodiment 31

A system according to embodiment 1 wherein said information comprises link information characterizing at least one of said radio links.

Embodiment 32

A system according to embodiment 28 wherein for the mobile station functionality co-located with said moving relay other than said individual moving relay, said unit which has base station functionality also comprises a base station functionality of a moving relay rather than a static base station, thereby to provide multi-hop capability to said system.

Embodiment 33

A system according to embodiment 27 in which an individual mobile station is connected to an individual base station functionality and wherein a decision to transfer said individual mobile station away from said individual base station functionality is made centrally by said relay network manager (DisNetRM).

Embodiment 34

A system according to embodiment 20 and also comprising a cellular network including a core device, at least one static base station, and a population of mobile stations communicating via antennae with at least one of the base stations wherein said individual mobile station decides to establish connection with the unit having base station functionality which, according to said plurality of route quality parameters, provides said individual mobile station with the best route to one of the static base stations.

Embodiment 35

A mobile communication network system operative in conjunction with a core network including a core device and at least one static base station, the system comprising:
a plurality of base stations; and
a population of mobile stations communicating via antennae with the base stations;
the base stations including at least one moving base station which communicates via antennae with the mobile stations and includes base station functionality, a first radio manager and mobile station functionality all co-located with the base station functionality,
the base station functionality having a physical back-connection to the first radio manager, the first radio manager having a physical connection with the mobile station functionality, the mobile station functionality communicating via antennae with at least one selectable static base station,
wherein the first radio manager comprises:
a radio resource manager; and
functionality for receiving information from, and sending information to, other radio managers, respectively co-located with other moving base stations, and for using the information to determine whether to reject at least one mobile station seeking to be served by an individual base station associated with the individual co-located radio manager,
wherein the information used to determine whether to reject includes at least one of the following:
location of said at least one moving base station; and
statistics re measurements of link quality.

Embodiment 36

A system according to embodiment 35 wherein said information comprises information regarding qualities of respective connections of respectively co-located radio managers back to the core network is provided by respectively co-located radio managers via a selected one of:
a static base station from among the at least one static base station of the core network; and
a moving base station capable of providing service to the individual radio manager's co-located mobile device.

Embodiment 37

A system according to embodiment 35 wherein said information regarding quality of its own connection back to the core network is provided by its own co-located mobile station.

Embodiment 38

A system according to embodiment 35 wherein said information includes information regarding channel quality which other base stations are able to provide mobile stations in the vicinity of the individual co-located radio manager and which is provided by reports generated by said mobile stations in said vicinity.

Embodiment 39

A system according to embodiment 35 wherein said information regarding quality of service available from its own base station for mobile stations in the vicinity of the individual co-located radio manager is provided by its own co-located mobile station.

Embodiment 40

A system according to embodiment 35 wherein said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 41

A system according to embodiment 40 wherein said parameter is based upon a minimum SNR (signal noise ratio) value, over sections which together compose a route, each section having its own SNR (signal noise ratio) value.

Embodiment 42

A system according to embodiment 40 wherein said parameter characterizing route quality is a combination of measured qualities of route sections and fluctuations thereof such that route sections with largely fluctuating quality measurements are devalued due to their unpredictability.

Embodiment 43

A system according to embodiment 35 wherein at least one individual co-located radio manager includes a mobile-to-mobile direct communication facilitation functionality operative to provide direct communication, not requiring said core network, between a plurality of mobile devices in said individual radio manager's vicinity.

Embodiment 44

A system according to embodiment 35 wherein said moving base station observes a silence period during which it refrains from transmitting to its own co-located mobile station.

Embodiment 45

A system according to embodiment 44 wherein at least one characteristic of said silence period is dynamically determined by the moving base station's co-located radio manager.

Embodiment 46

A system according to embodiment 45 wherein said characteristic comprises a zone in which silence is observed which is defined over at least one of a frequency band and a time window.

Embodiment 47

A system according to embodiment 35 wherein said network comprises a tactical E-UTRAN network.

Embodiment 48

A system according to embodiment 35 wherein if a multi-hop communication route is used, in which a relay R that is connected to the core network via another relay A, relay R sends a message to a backhauling relay that R is A's anchor.

Embodiment 49

A system according to embodiment 35 wherein said static base station is co-located with said core device.

Embodiment 50

A system according to embodiment 35 wherein said physical back-connection comprises an Ethernet back-connection.

Embodiment 51

A system according to embodiment 35 wherein said radio resource manager comprises an E-UTRAN radio resource manager.

Embodiment 52

A mobile communication networking method comprising:
providing a core network including a core device and at least one static base station; a plurality of base stations; and a population of mobile stations communicating via antennae with the base stations;
  the base stations including at least one moving base station which communicates via antennae with the mobile stations and includes base station functionality, a first radio manager and mobile station functionality all co-located with said base station functionality,
  the base station functionality having a physical back-connection to the first radio manager, the first radio manager having a physical connection with said mobile station functionality, the mobile station functionality communicating via antennae with at least one selectable static base station,
  wherein said first radio manager comprises a radio resource manager; and functionality for receiving information from, and sending information to, other radio managers, respectively co-located with other moving base stations; and
using said information to determine whether to reject at least one mobile station seeking to be served by an individual base station associated with said first radio manager.

Embodiment 53

A system according to embodiment 35 wherein users are shown a good location for Quality Grade Result (QGR).

Embodiment 54

A system according to embodiment 53 wherein statistical measurements of a co-located mobile station in each at least one relay are attached to location results of the relay and wherein said system includes at least one relay radio manager (rRM) having a functionality that computes and indicates to the user locations with good QGC (quality grade control).

Embodiment 55

A system according to embodiment 48 wherein the backhauling relay becomes aware that another relay is connected to it and finds a good place to remain.

Embodiment 56

A system according to embodiment 35 wherein said information includes information regarding qualities of other base stations' respective connections back to the core network.

Embodiment 57

A system according to embodiment 35 wherein said information includes information regarding quality of the first radio manager's moving base station's connection back to the core network.

Embodiment 58

A system according to embodiment 35 wherein said information includes information regarding channel qualities which said first radio manager's own base station, and base stations other than said first radio manager's own base station, are respectively able to provide, to mobile stations in the vicinity of the first radio manager.

Embodiment 59

A method according to embodiment 52 wherein said information includes information regarding qualities of other base stations' respective connections back to the core network.

Embodiment 60

A method according to embodiment 52 wherein said information includes information regarding quality of the first radio manager's moving base station's connection back to the core network.

Embodiment 61

A method according to embodiment 52 wherein said information includes information regarding channel qualities which said first radio manager's own base station, and base stations other than said first radio manager's own base station, are respectively able to provide, to mobile stations in the vicinity of the first radio manager.

Embodiment 62

Combinations of embodiments with other embodiments.

Embodiment 63

A mobile communication network system operative in conjunction with a network including a core device, a plurality of base stations including at least one static base station, and a population of mobile stations communicating via antennae with at least one of the base stations, the system comprising:

at least one moving base station included in said plurality of base stations which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station, wherein the first radio manager comprises:

a radio resource manager; and functionality for receiving information from, and for sending information to, other radio managers, respectively co-located with other moving base stations, and for using the information to determine whether to reject at least one mobile station seeking to be served by an individual base station associated with the individual co-located radio manager.

Embodiment 64

A mobile communication network system operative in conjunction with a network including a core device, a plurality of base stations including at least one static base station, and a population of mobile stations communicating via antennae with at least one of the base stations, the system comprising:

at least one moving base station included in said plurality of base stations which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station, wherein the first radio manager comprises:

a radio resource manager; and functionality for receiving information from, and sending information to, other radio managers, respectively co-located with other moving base stations, wherein at least one radio manager is operative to compute, for at least one individual moving base station, route comparison information including a plurality of routes of base stations via which the individual moving base station can communicate with the core network and at least one parameter characterizing the relative quality of each of said routes and wherein said individual moving base station connects to a serving base station selected at least partly based on information indicative of said route comparison information, and wherein the plurality of routes of base stations via which the individual moving base station can communicate with the core network includes at least one route characterized by multi-hop backhauling.

Embodiment 65

A system according to embodiment 63 wherein said mobile station seeking to be served by said individual base station includes a mobile station currently being served by said individual base station.

Embodiment 66

A system according to embodiment 63 wherein said individual base station is co-located with the individual co-located radio manager.

Embodiment 67

A system according to embodiment 63 wherein said individual base station is served by the individual co-located radio manager.

Embodiment 68

A system according to embodiment 63 wherein said functionality is also operative to determine a base station other than said individual base station, which is more suitable than said individual base station to serve said mobile station seeking to be served.

Embodiment 69

A system according to embodiment 63 wherein at least one radio manager is operative to compute, for at least one individual moving base station, route comparison information including a plurality of routes of base stations via which the individual moving base station can communicate with the core network and at least one parameter characterizing the relative quality of each of said routes and wherein said individual moving base station connects to a serving base station selected at least partly based on information indicative of said route comparison information.

Embodiment 70

A system according to embodiment 64 wherein each said other radio manager is operative to compute, for at least one individual mobile station, route comparison information including a plurality of routes of base stations via which the individual mobile station can communicate with the core network and at least one parameter characterizing the relative quality of each of said routes and to communicate to said individual mobile station information indicative of said route comparison information and wherein said individual mobile station is operative to select a base station to be connected to, at least partly based on said information indicative of said route comparison information.

Embodiment 71

A system according to embodiment 64 wherein the radio manager computes said route comparison information for an individual moving base station served thereby whose mobile station functionality is communicating in idle mode, via antenna, with at least one selectable base station.

Embodiment 72

A system according to embodiment 64 wherein the radio manager computes said route comparison information for a moving base station co-located therewith whose mobile station functionality is communicating in active mode, via antenna, with at least one selectable base station.

Embodiment 73

A system according to embodiment 71 and wherein the individual moving base station camps on said serving base station selected at least partly based on said information indicative of said route comparison information.

Embodiment 74

A system according to embodiment 72 and wherein the individual moving base station is handed over to said serving base station selected at least partly based on said information indicative of said route comparison information.

Embodiment 75

A system according to embodiment 63 and also comprising a core device and wherein the core device allocates constant communication session bandwidth between each mobile station functionality and the base station with which it is communicating so as to maintain a constant active mode of communication between each mobile station functionality and the base station.

Embodiment 76

A system according to embodiment 64 and also comprising a core device and wherein the core device allocates constant communication session bandwidth between each mobile station functionality and the base station with which it is communicating so as to maintain a constant active mode of communication between each mobile station functionality and the base station.

Embodiment 77

A mobile communication network system serving a population of mobile stations communicating via antennae with base stations, the system including:
a plurality of base stations including at least one static base station and at least one moving base station which communicates via antennae with the mobile stations and includes base station functionality, a first radio manager and mobile station functionality all co-located with the base station functionality, the base station functionality having a physical back-connection to the first radio manager, the first radio manager having a physical connection with the mobile station functionality, the mobile station functionality communicating via antennae with at least one selectable base station; and
a core device which allocates constant communication session traffic between each mobile station functionality and the base station with which it is communicating so as to maintain a constant active mode of communication between each mobile station functionality and the base station.

Embodiment 78

A system according to embodiment 56 wherein said other base stations include all base stations along a route connecting said moving base station and said core, via which route said core serves said moving base station.

Embodiment 79

A system according to embodiment 77 wherein said other base stations include all base stations along a route connecting said moving base station and said core, via which route said core serves said moving base station.

Embodiment 80

A system according to embodiment 64 wherein said information includes information regarding channel qualities which said first radio manager's own base station, and base stations other than said first radio manager's own base station, are respectively able to provide, to mobile stations in the vicinity of the first radio manager.

Embodiment 81

A system according to embodiment 63 wherein said functionality is operative for detecting the quality of each end-user section and the quality of each backhauling section according to mobile stations' and mobile station functionalities' measurements and for combining said qualities into quality grade results for a current route and for alternative routes for at least one mobile station.

Embodiment 82

A system according to embodiment 81 and wherein said quality grade results are broadcast to at least one mobile station.

Embodiment 83

A system according to embodiment 81 wherein at least one handover decision, to hand over a node from one base station to another, is made by taking into account, for at least one alternative route, the quality grade result of access and backhauling sections.

Embodiment 84

A system according to embodiment 81 wherein at least one cell admission decision is made by taking into account, for at least one alternative route, the quality grade result of access and backhauling sections.

Embodiment 85

A system according to embodiment 81 wherein at least one cell reselection decision is made by taking into account, for at least one alternative route, the quality grade result of access and backhauling sections.

Embodiment 86

A system according to embodiment 81 wherein said mobile stations' and mobile station functionalities' measurements include RSRP.

Embodiment 87

A system according to embodiment 81 wherein said mobile stations' and mobile station functionalities' measurements include RSRI.

Embodiment 88

A system according to embodiment 81 wherein said mobile stations' and mobile station functionalities' measurements include RSRQ.

Embodiment 89

A system according to embodiment 63 wherein each radio manager uses measurements from at least one other radio manager over a sub-network, and at least one of RSRP, RSRI and RSRQ measurements from at least one of its co-located mobile station functionality and a mobile station, to build a radio resource measurements table.

Embodiment 90

A system according to embodiment 89 wherein at least one of said measurements is distributed by broadcast message type to all radio managers.

Embodiment 91

A system according to embodiment 81 wherein the Quality Grade Result (QGR) of all alternative routes is distributed to mobile stations using a broadcast message.

Embodiment 92

A system according to embodiment 91 wherein the broadcast message relating to each individual base station is sent to all mobile stations camping on said individual base station.

Embodiment 93

A system according to embodiment 64 wherein said information includes information regarding qualities of other base stations' respective connections back to the core network.

Embodiment 94

A system according to embodiment 63 wherein said information is transmitted between "colleague" radio managers via radio.

Embodiment 95

A system according to embodiment 63 wherein at least one radio manager "masquerades" as a base station by sending a request to a mobile station functionality to execute an NMR (Network Measurement Report) measurement.

Embodiment 96

A system according to embodiment 63 wherein said information includes information regarding quality at which the first radio manager's mobile station functionality would be served by each base station capable of serving the first radio manager's mobile station functionality.

Embodiment 97

Combinations of a subset of features of certain embodiments with a subset of features of other embodiments.

Embodiment 98

A system according to embodiment 1 and wherein said radio manager includes an in-band multi-hop backhauling functionality.

Embodiment 99

A system according to embodiment 98 wherein said in-band multi-hop backhauling functionality is operative to enhance immunity due to interference by creating new alternative routes to replace routes that are dropped due to interference, wherein each new alternative route includes a section between the end-user mobile station and mobile relay it is connected to, and a backhauling section, including the links between the mobile relays that take part as nodes in the route.

Embodiment 100

A system according to embodiment 1 wherein backhauling connectivity is provided by utilizing multi-hop routes between said moving relays.

Embodiment 101

A system according to embodiment 1 wherein backhauling of said moving relays comprises in-band multi-hop backhauling.

Embodiment 102

A system according to embodiment 1 wherein for at least one mobile station functionality in at least one individual moving relay, said unit which has base station functionality comprises an LTE base station functionality.

Embodiment 103

A system according to embodiment 1 wherein for at least one mobile station functionality in at least one individual moving relay, said unit which has base station functionality comprises a 2G base station functionality.

Embodiment 104

A system according to embodiment 1 wherein for at least one mobile station functionality in at least one individual moving relay, said unit which has base station functionality comprises a 3G base station functionality.

Figure 2:
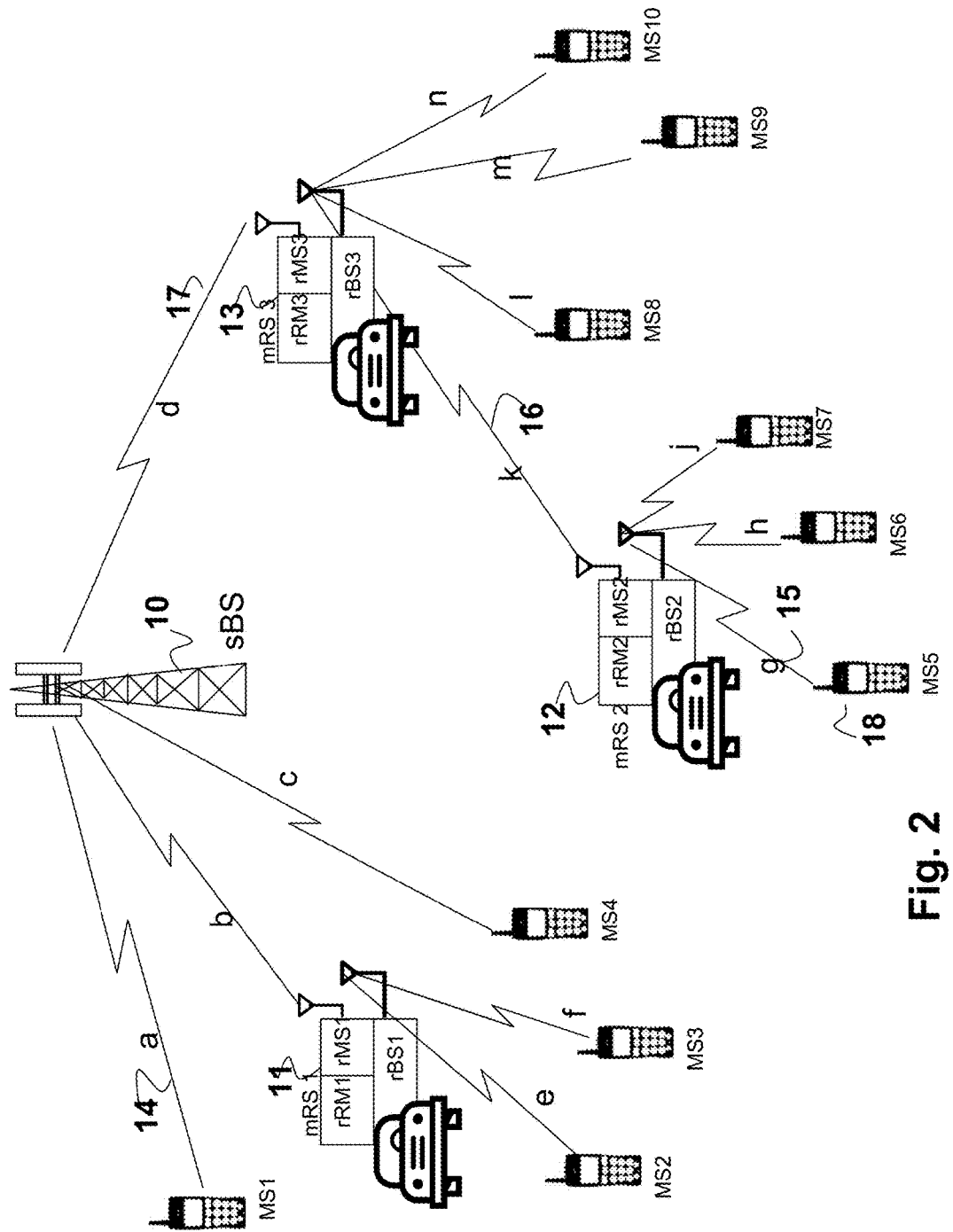
FIG. 2 illustrates a network that uses mobile relays that connect on the one side to mobile stations or other relays and on the other side to another base station; all according to one embodiment of the present invention.
Figure 3:
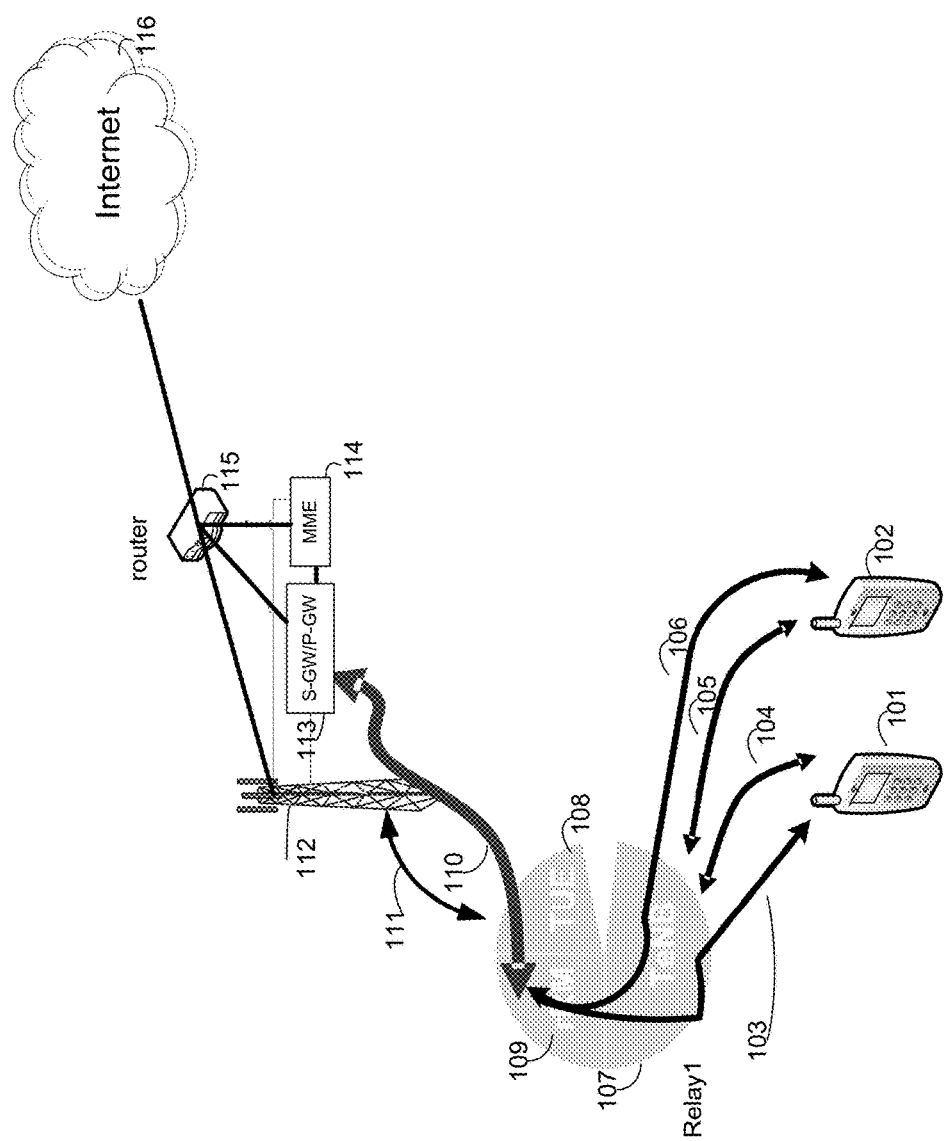
FIG. 3 describes an example data path from mobile stations to the Internet via relay device, standard base station and core network; all according to one embodiment of the present invention.
Figure 4:
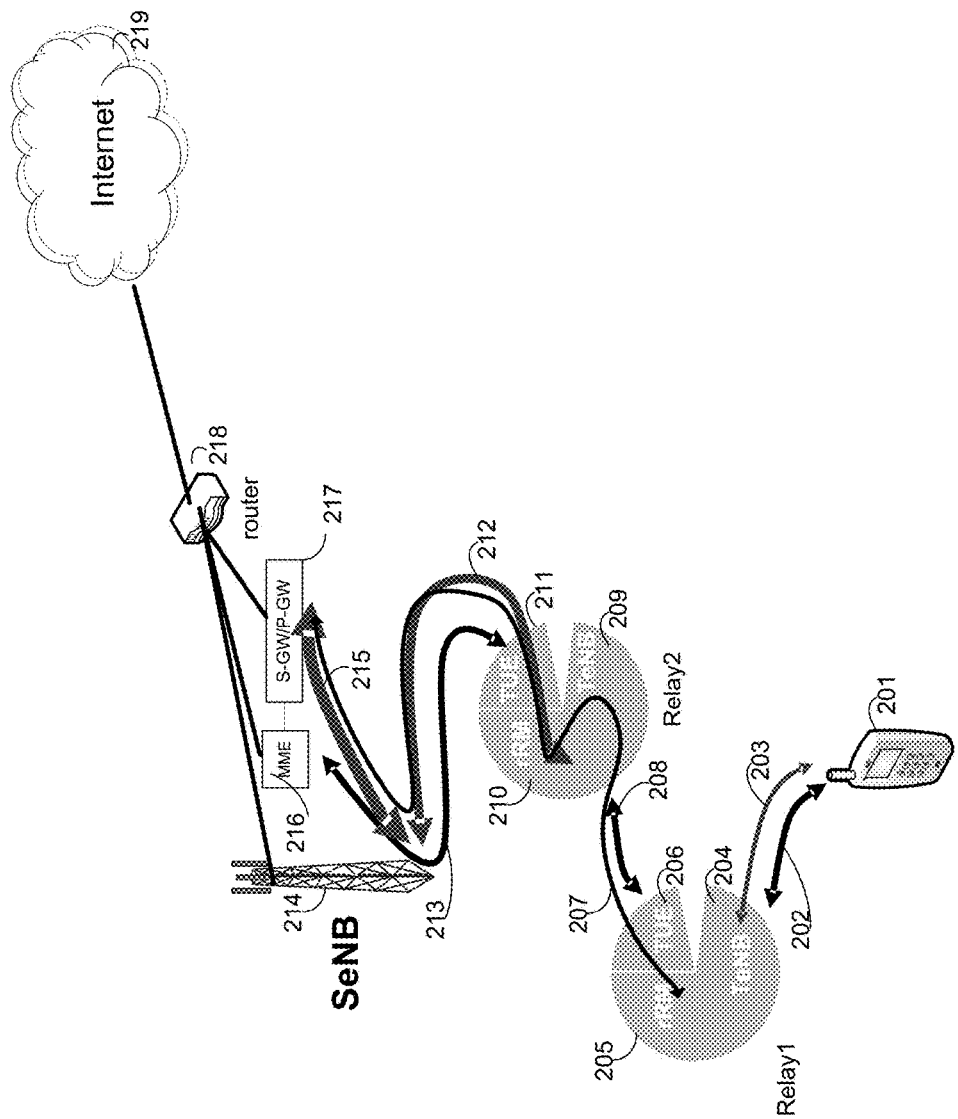
FIG. 4 describes the same flow when passing through multiple hops, according to one embodiment of the present invention.
Figure 5:
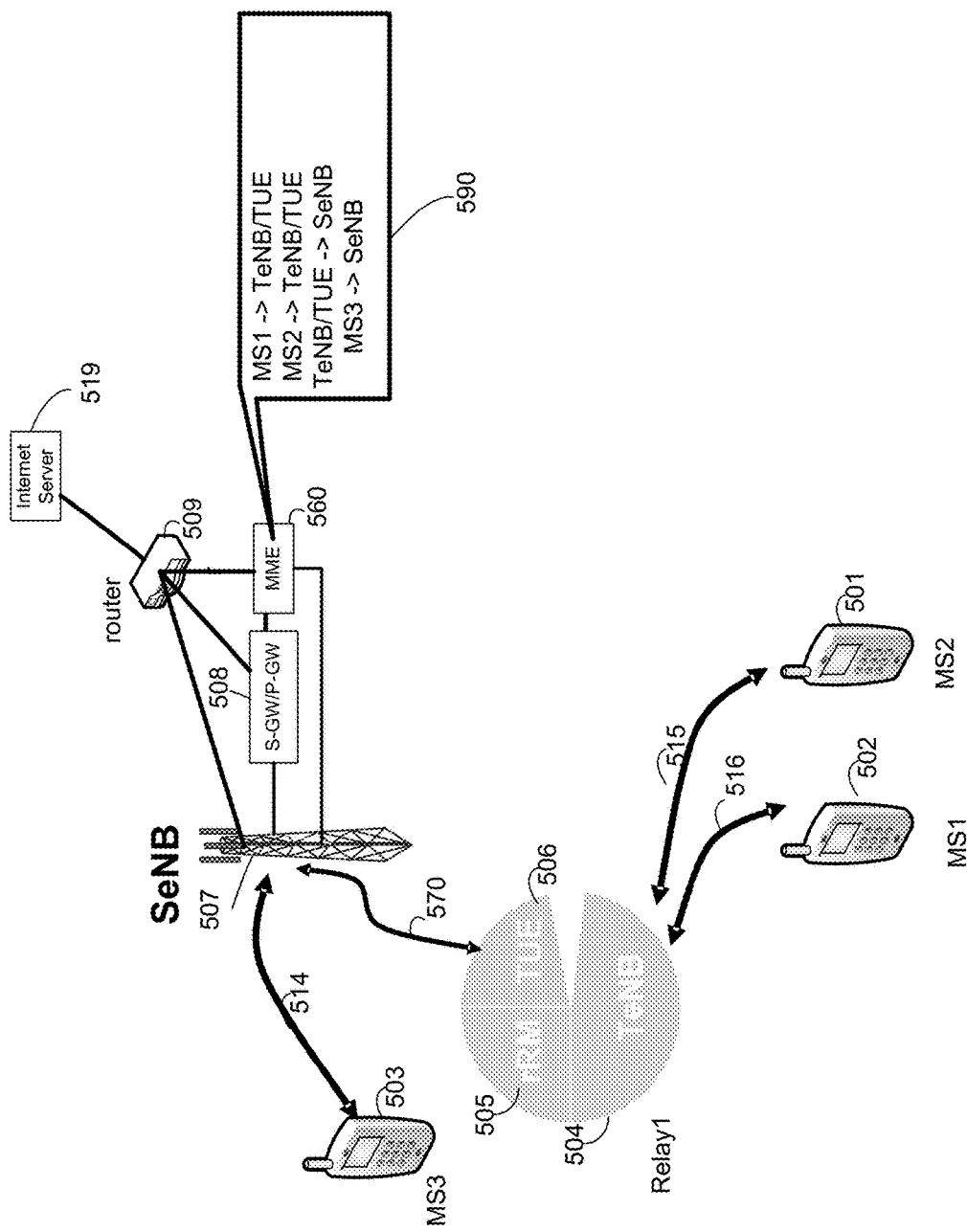
FIG. 5 describes example of the encapsulation of data on the route through relay, stationary base station and core network for the case of single hop, according to one embodiment of the present invention.

Any or all of the rBS/rRM/rMS relay nodes shown in FIG. 2 and the TeNB/rRM/TUE nodes shown in FIGS. 3-5 may be implemented by the moving relays each including base station functionality, radio manager and mobile station functionality of Published PCT Application No. WO/2011/092698, other than those modifications shown and described herein.

In existing LTE cellular networks, each mobile station is typically identified by one or more unique IP addresses. A packet that is addressed to a mobile station is typically routed through an IP connectivity gateway (e.g. P\S-GW in LTE or GGSN/SGSN in 3G UMTS or HPSA or CSN in WiMAX) using a tunnel (e.g. GTP tunnel in LTE) to the base station and from there to the mobile telephone.

In hierarchical cellular networks, (e.g. 3GPP TS36.806) the packet is typically routed through several tunnels and then routed to the addressed mobile station.

Certain embodiments of the present invention may be utilized in scenarios incorporating a mobile relay which typically comprises base station functionality (termed herein TeNB), mobile station functionality (termed herein TUE or tUE) and relay radio/resource manager (rRM) e.g. as described in PCT application No. IL2011/000096 entitled "Cellular Communication System with Moving Base Stations and Methods and Apparatus Useful in Conjunction Therewith", filed Jan. 27, 2011; published as WO/2011/092698 on 4 Aug. 2011.

In LTE, the core network that serves these relays and other standard base stations typically uses the standard LTE core elements. In certain embodiments of the present invention a conventional router is added to the core and is connected to the gateway (e.g. P/S-GW) (e.g. as per FIG. 3), and optionally to a mobility management entity e.g. MME.

A mobile station (e.g. 101 & 102) may register for service to either the stationary base station (112) or to the base station functionality in a relay (107), that may comprise either a stationary or mobile relay.

In FIG. 3 the mobile stations (101, 102) are registered with Relay1, the mobile stations (101, 102) typically communicate with the Base station functionality (TeNB) (107) using the LTE air interface. As part of the registration process, the mobile stations (101, 102) typically receives an IP address e.g. by the gateway (e.g. P/S-GW) (113) that may be used by the mobile stations (101, 102) for their IP traffic over the air interface (104 & 105).

The TUE function in the relay typically registers to one of the stationary base stations (112) or to other relay base station functionality (e.g. TeNB) which may then communicate with the relay whom the TUE is part of e.g. via the LTE air interface (111).

The traffic from the mobile stations (101, 102) is typically received in the Base station functionality (TeNB) (107) and encapsulated by the Base station functionality (TeNB) (107) e.g. using a GTP tunnel (103,106).

Typically, the traffic is then directed to the TUE (108) and sent to the Stationary base station (SeNB) (112) which then typically encapsulates it and sends it to the gateway (e.g. P/S-GW) (113) using additional GTP tunnel (110).

Typically, e.g. in FIGS. 3, 4 and 5, arrows that do not extend into the near-"circle" representing a relay node (e.g. arrows 104, 105 in FIG. 3) represent air interfaces (physical layer) whereas arrows that do extend into the near-"circle" representing a relay node typically represent, represent higher layer interfaces.

Thick black arrows (e.g. arrow 110 in FIG. 3 or arrow 212 in FIG. 4) typically represent general IP-based communication. Thinner arrows e.g. arrows 202, 203 in FIG. 4 typically represent a GPRS tunnel. The width of the GPRS tunnel typically indicates that it is a tunnel inside a tunnel, e.g. as represented by a small dark-gray arrow (such as arrow 510 in FIG. 6) inside a large, light-gray arrow (such as arrow 512 in FIG. 6). This follows a convention similar to the 3GPP relay convention e.g. as shown in 3GPP TR 36.806's figure numbers 4.2.2-2 and 4.2.3-4.

Figure 8:
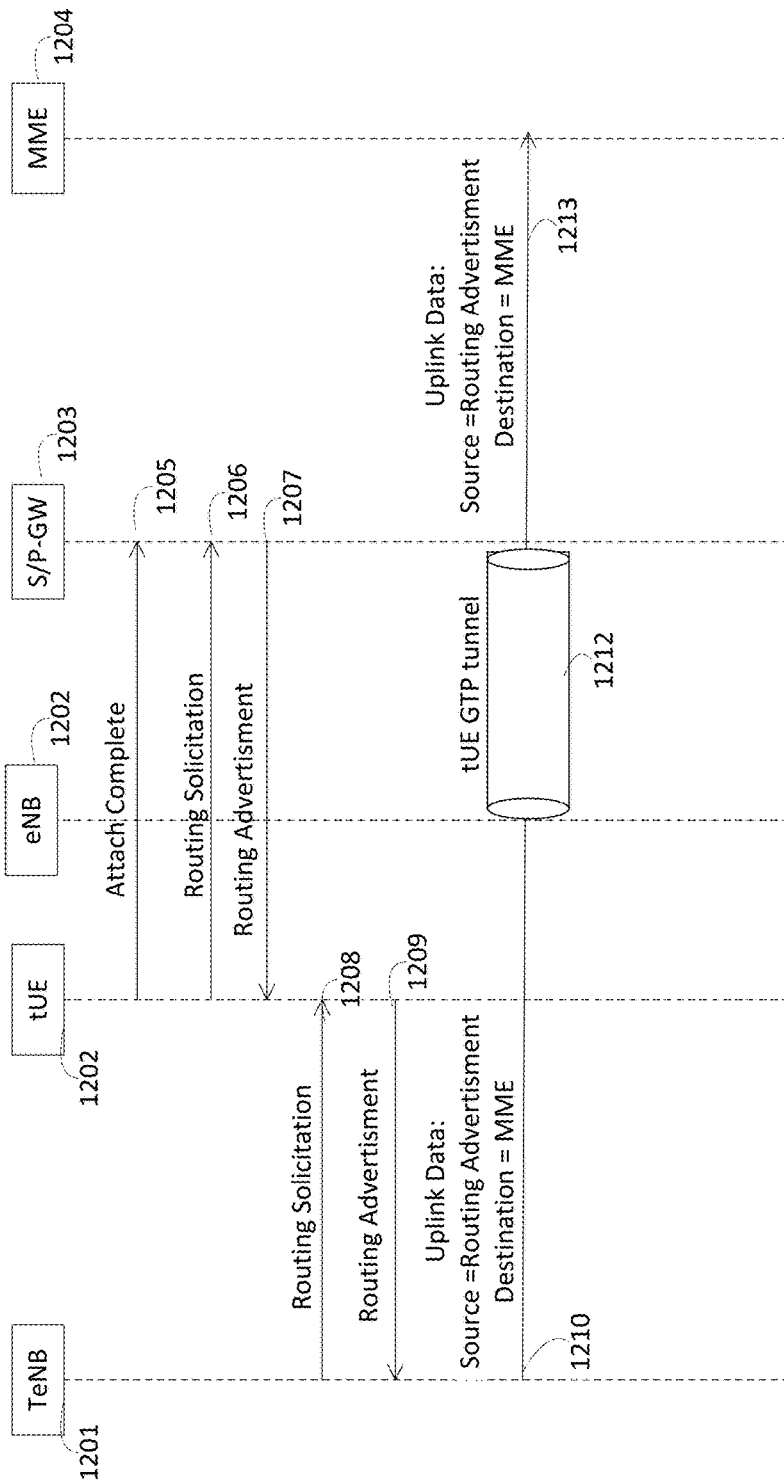
FIG. 8 illustrates a relay address allocation scheme, according to one embodiment of the present invention.

It is appreciated that, as shown in FIG. 8, the router may be the default gateway of all stationary network elements and the s- or p-gateway may be the determination point of all GPRS tunnels such that the tunnels' packets are sent back and forward between gateway S/P-GW and Router until all GPRS headers have been removed.

Figure 6:
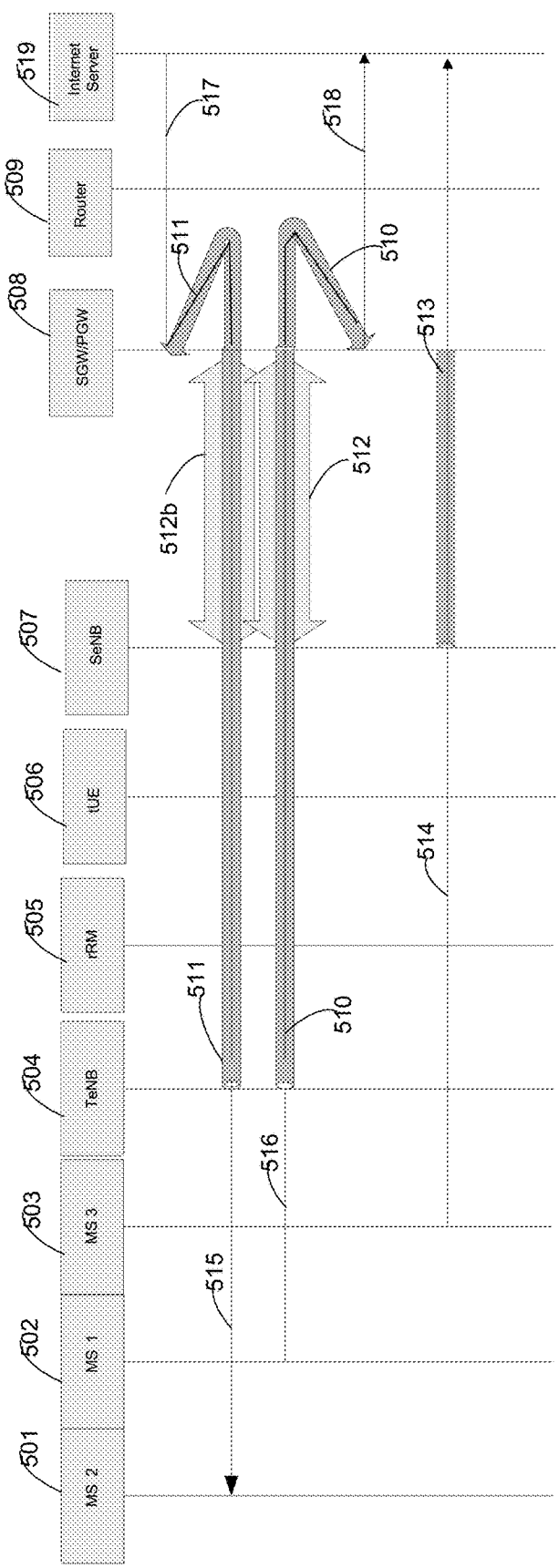
FIG. 6 describes an example of the encapsulation delivery steps of data on the route through relay and network for the case of single relay, according to one embodiment of the present invention.

FIGS. 5 and 6 describe an example encapsulation process having various stages. FIG. 5 illustrates an example scenario of three mobile stations, two of which (416, 417) use Relay1 in order to connect to the static network. FIG. 6 describes an example of encapsulation delivery steps suitable for the scenario of FIG. 5. Mobile station MS1 (502) typically sends data to the Base station functionality (TeNB) (504) as IP traffic (516). The source address typically comprises the IP address provided to mobile station MS1 during its registration and the destination address may be, for example, a server on a global network not served by the local core, e.g. Internet (519), or other mobile station, or static station, or other server (such as but not limited to video broadcast, voice, SIP, gaming).

The Base station functionality (TeNB) (504) typically encapsulates the data in a GTP tunnel (510) with the source address typically comprising or being the address given to the Mobile station functionality (tUE) (506) when it registered to the mobile relays network APN and used to encapsulate Base station functionality (TeNB) (504) communication data. The destination address is typically that of the gateway (e.g. P/S-GW) (508) that was assigned to mobile station MS1 (502).

The data is typically sent via the LTE air interface from the Mobile station functionality (tUE) (506) to the stationary base station SeNB (507).

Typically, the Stationary base station (SeNB) then encapsulates the data in another GTP tunnel (512) with the source address typically comprising the IP address of the Stationary base station (SeNB) (507). The IP address of the Stationary base station (SeNB) may be either static or dynamic and the destination address typically comprises the gateway (e.g. P/S-GW) (508) that was assigned to the Mobile station functionality (tUE) (506).

The data is typically received by the gateway (e.g. P/S-GW) (508) that initially de-capsulates the GTP tunnel from the Stationary base station (SeNB) (512). The resultant packet typically comprises a tunneled (510) packet forwarded out to the router function (509).

Typically, the destination address for the resultant packet is now the gateway (e.g. P/S-GW) (508) of mobile station MS1 (502), and the router therefore redirects the resultant packet (510), typically back to the gateway (e.g. P/S-GW) (508), e.g. the same gateway (e.g. P/S-GW) the packet came from, or another gateway (e.g. P/S-GW), if the two assigned gateways (e.g. P/S-GWs) for Mobile station functionality (tUE) and for mobile station MS1 are different.

The gateway (e.g. P/S-GW) (508) now typically de-capsulates the second GTP tunnel (510) and forwards the IP traffic (516) to the router (509) again (518).

The destination address may be the original destination address of the packet (in the illustrated example a server on the Internet (519)). The router (509) may then forward the packet to the Internet server (519).

In the reverse direction, the process again typically comprises bouncing of the packet e.g. between the gateway (e.g. P/S-GW) (508) and the router (509).

A packet sourced from an Internet server (519) and addressed to the IP address of mobile station MS2 (501), may be forwarded to the router (509) from the Internet. The router then typically forwards it to the gateway (e.g. P/S-GW) (508) that is presented to the network as a router. The mobility management entity that is part of the core in which the gateway (e.g. P/S-GW) or other gateway resides typically holds a list matching IP addresses for mobile stations with the base stations that serve these mobile stations. The gateway (e.g. P/S-GW) then typically encapsulates the traffic in a GTP tunnel and sends the traffic directly or via router to the relevant mobile station. It is appreciated that gateway (e.g. P/S-GW) is merely an example and throughout, mutatis mutandis, other gateways may be employed.

In the illustrated embodiment, the record of the IP addresses matching list for mobile station MS1 may be the IP address of the mobile relay (the Mobile station functionality (tUE) (506) IP address). The GTP packet (511) may then be forwarded to the router function (509) that may bounce it back to the gateway (e.g. P/S-GW) (508).

The gateway (e.g. P/S-GW) (508) now typically receives a packet with Mobile station functionality (tUE) (506) destination address; its matching list record for the Mobile station functionality (tUE) (506) is Stationary base station (SeNB) (507). The gateway (e.g. P/S-GW) (508) may encapsulate the packet again in a GTP tunnel (512*b*) addressed to Stationary base station (SeNB) (507).

The router receiving the packet may forward it over GTP tunnel (512*b*) to the Stationary base station (SeNB) (507) which may de-capsulate the packet and send the decapsulated packet over the air interface to Mobile station functionality (tUE) (506). The Mobile station functionality (tUE) (506) typically passes the decapsulated packet on to the Base station functionality (TeNB) (504) that, typically, de-capsulates the second GTP tunnel (511) and forwards the packet over the air interface (515) to its final destination e.g. mobile station MS2 (501).

For the router function to operate in these scenarios and be able to correctly forward packets, a suitable PDN (Packet Data Network) and address assignment may be used:

TUEs (e.g. mobile station functionalities within relay/s) typically use specific APN and register to separate PDN that has a specific IP address pool (as an example (10.0.X.X).

standard/static base stations that connect directly to core and gateway (e.g. P/S-GW) are typically assigned addresses from a different pool (e.g. 10.1.X.X).

Standard mobile stations typically use a different APN and PDN and are typically assigned an IP address from a different pool (e.g. 85.X.X.X).

The following configuration now allows convenient configuration of the router function to operate correctly and forward packets as needed.

The bouncing back of functions to the gateway (e.g. P/S-GW) may be performed by the router itself or performed internally in the gateway (e.g. P/S-GW) as the gateway (e.g. P/S-GW) recognizes the destination IP address as its own address (this may be gateway (e.g. P/S-GW) implementation dependent).

The above-described scheme may be extended to cover scenarios where the mobile station is connected to the core network via multiple relays (e.g. multi-hop cellular network).

FIG. 4 describes an example scenario of connection of mobile station (201) to the core via two relays.

The mobile station (201) connects, say, to Relay1's Base station functionality (TeNB) (204) on the air interface (202). The Relay1 TUE function (206) connects, say, to the Relay2 Base station functionality (TeNB) (209) via a wireless interface (208) e.g. through the air.

The TUE of Relay2 is connected, say, to the stationary base station SeNB (214) via air interface (213).

Data originated from mobile station MS1 is sent to Relay1's Base station functionality (TeNB) (204) via a link (203) and is typically encapsulated in a GTP tunnel and sent by Relay1 TUE (206) to Relay2's Base station functionality (TeNB) (209) via a link (207). The encapsulated data is then encapsulated again, in a second GTP tunnel (212) and sent from Relay2 TUE (211) to Stationary base station (SeNB) (214). The Stationary base station (SeNB) (214) encapsulates the data in a third GTP tunnel (215) and sends the thrice-encapsulated data over to the gateway (e.g. P/S-GW) (217). The data is then bounced from gateway (e.g. P/S-GW) (217) to the router (218) three times until all GTP tunnels are de-capsulated and data is forwarded to its final destination.

Figure 7:
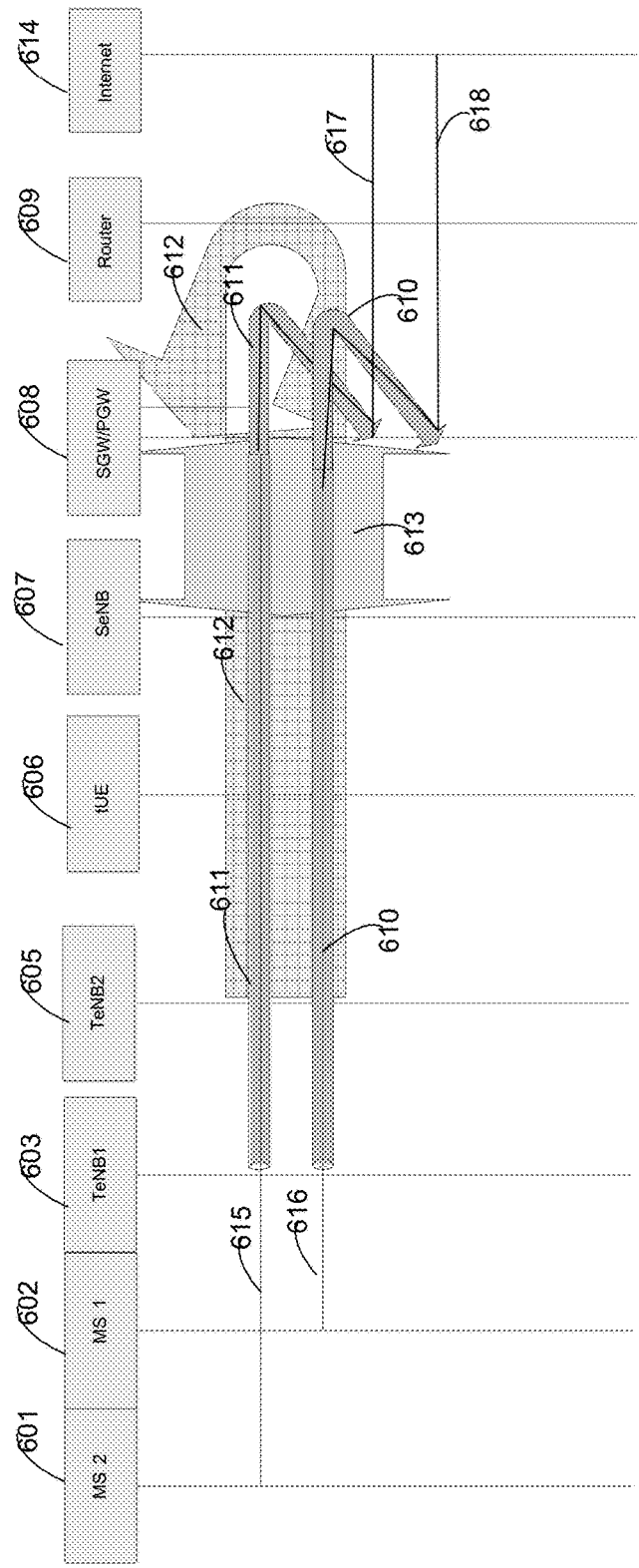
FIG. 7 describes the encapsulation delivery steps for the case of multiple relays, according to one embodiment of the present invention.

FIG. 7 describes encapsulation delivery steps suitable for the scenario of FIG. 4.

It is appreciated that the above description may be expanded to apply to any number of relay layers or hops. Any additional relay on the path between the mobile station and the core may add its own GTP tunnel, and packets received on gateway (e.g. P/S-GW) may need to go through an additional iteration of encapsulation or de-capsulation before forwarding to a final destination.

The operational scheme, relay structure and core elements setup and configuration as described above allow for the implementation of the hierarchical relay scheme, typically with no changes to core infrastructure. The only addition may be the router function, which in some setups/implementations may exist, e.g. if the gateway (e.g. P/S-GW) includes integral router functionality.

An additional feature which enables the multi-hop tunneling capability described herein and which may be provided according to certain embodiments, is the ability to change data, such as assignments of base stations to mobile stations, in the mobility management entity e.g. MME.

The scheme may therefore be implemented, according to certain embodiments, on standard deployed core infrastructure e.g. by configuration of routers and APN/PDN address pool assignments as described above.

An advantage of certain embodiments described herein is that mobile stations are typically essentially unaware of the multi hop forwarding of their traffic and no change of the mobile stations may be effected.

The relay function may comprise standard LTE components (e.g. eNB and mobile station) with a specific control and routing function as described.

The described scheme, according to some embodiments, may introduce overheads that increase with the increase of number of relays in the path due to multiple GTP tunnel layers, yet provides a very convenient solution for introduction of relay structure with minimal changes to infrastructure e.g. addition of router and configuration of the mobility management entity e.g. MME according to routing information, e.g. tree topology, as above, and convenient relay function.

In order to able to send data from the Base station functionality (TeNB) to the core over Mobile station functionality (tUE) and back using the given Mobile station functionality (tUE) address, stateless address autoconfiguration mechanism e.g. according to RFC 4862 may be employed. As shown in FIG. 8, the Mobile station functionality (tUE) [1202] may configure an IP address during the 'attach' procedure. After a default bearer has been established[1205], the Mobile station functionality (tUE) may send a Router Solicitation message [1206] to trigger the network e.g. to send a Router Advertisement[1207] (e.g. as per IETF RFC 4861). The PDN GW [1203] may periodically send Router Advertisement [1207] messages, typically as soon as the default bearer has been established, which typically corresponds to the Mobile station functionality (tUE) ipv6 64 bit network prefix address. There may be no restriction on the value of the interface identifier, since the prefixes are typically uniquely allocated to the UE.

The PDN GW[1203] typically guarantees that the prefixes in the Router Advertisements are unique. So, when creating a global IPv6 address, the Mobile station functionality (tUE) may use any interface identifier, for example converting the 48-bit MAC address to the 64-bit interface identifier. The Base station functionality (TeNB) [1201, 1208, 1209] may use the same mechanism, where the Mobile station functionality (tUE) may advertise its Routing Advertisement. When the Base station functionality (TeNB) [1210] sends the encapsulated data in a GTP tunnel[1212], Base station functionality (TeNB) [1210] typically uses the same uniquely allocated prefix of the Mobile station functionality (tUE), and in this way the tunneled data seems (to the core elements such as P/S-GW) as though the tunneled data came from the Mobile station functionality (tUE). A router functionality which resides in the Mobile station functionality (tUE) may route messages designated to Base station functionality (TeNB) or to Mobile station functionality (tUE) due to the different interface identifier.

Figure 9:
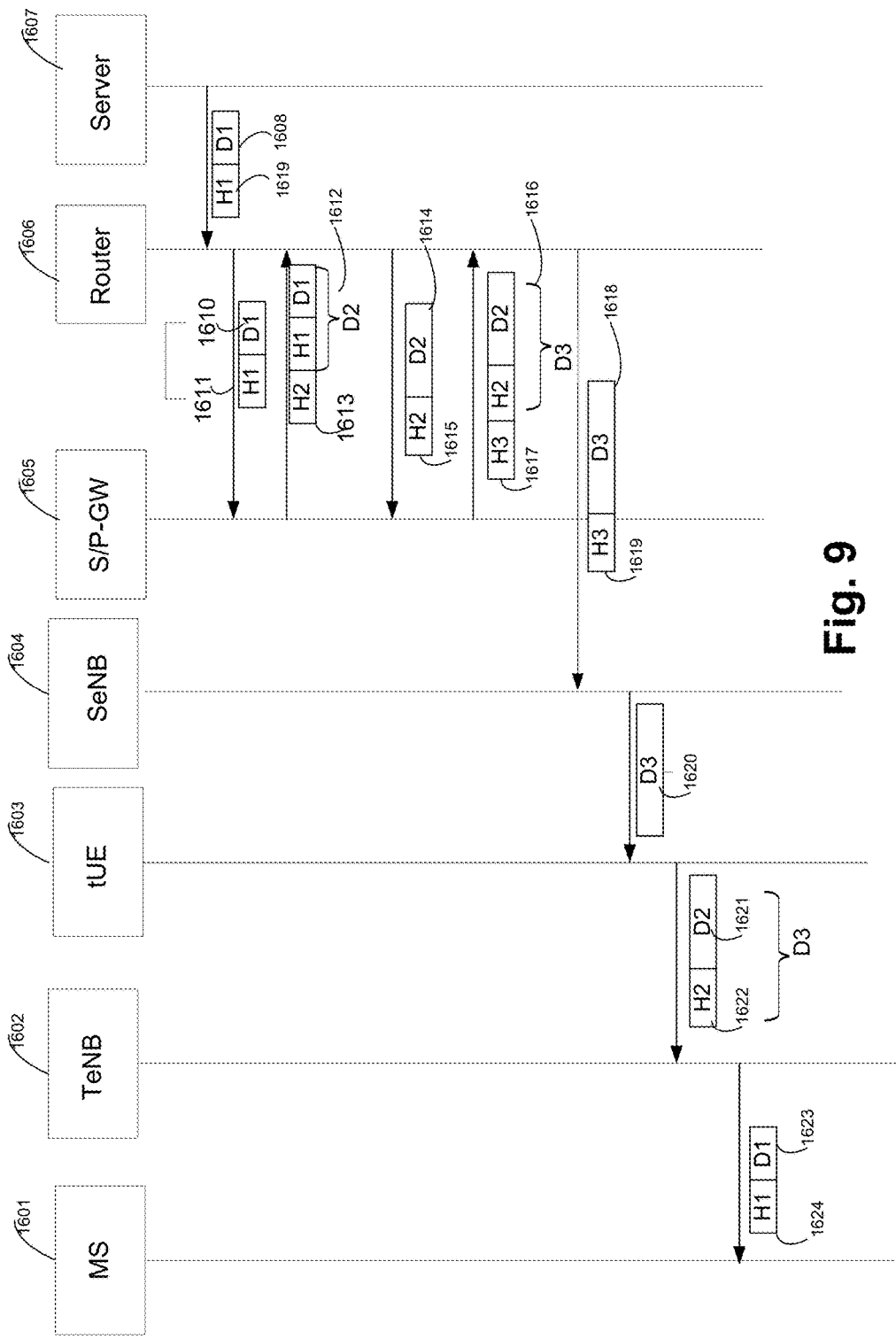
FIG. 9 is a sequence diagram explaining encapsulation delivery steps for multi-hop relay applications, according to one embodiment of the present invention.

FIG. 9 is a sequence diagram explaining an example encapsulation delivery method for multi-hop relay applications. The mobile stations typically constitute or include a subnet of mobile stations; the Base station functionality (TeNB) and reNB typically share the same subnet address, different from the subnet address of the stationary core which comprises elements: Stationary base station (SeNB) [1604], S/P-GW[1605] and Router [1606].

From the point of view of the core, Base station functionality (TeNB) is typically addressed by using the ip address of Mobile station functionality (tUE). This may be effected by using a NAT application or by sharing the same ipv6 network prefix and using a stateless address autoconfiguration in the IP address allocation of the Mobile station functionality (tUE). The Router [1606] is typically configured to send packets that are addressed to the ip address (subnet) that belongs to mobile stations and relay mobile stations to the gateway S/P-GW [1605]. The Router [1606] typically serves as the default gateway of the Stationary base station (SeNB)[1604], Server[1607] and the S/P-GW [1605]. The Stationary base station (SeNB) and the router typically have routable address; the router is operative to communicate with the Stationary base station (SeNB) without involving the gateway S/P-GW.

A server typically sends payload data D1 [1608], with a header that indicates the server as the source address and mobile station MS as the designated address, to the default gateway [1606]. The router sends payload data [1610] and header [1611] on to the gateway S/P-GW [1605]. The S/P-GW[1605], as part of the GPRS tunneling, takes the payload data [1610] and header [1611], encapsulates them as payload D2 [1612], adds a header [1613] which indicates the S/P-GW[1605] as the source address and the serving base station [1602] of the Base station functionality (TeNB) [1602] as the destination address, and sends the playload and header to the default gateway [1606].

Base station functionality (TeNB)'s IP address typically belongs to the addresses that are configured to be routed to the S/P-GW [1605]. The router sends the payload data [1614] and header [1615] to the S/P-GW [1605]. Base station functionality (TeNB) is typically addressed through Mobile station functionality (tUE) so as part of, e.g., the GPRS tunneling protocol the gateway S/P-GW typically adds another header H3 [1617] indicating the source as gateway S/P-GW and the destination as the serving base station of Mobile station functionality (tUE) and Stationary base station (SeNB). The original header (H2) and data (D2) is typically loaded as a payload D3 [1618].

The gateway (e.g. P/S-GW) typically sends payload [1616] and header [1617] to the router. As the subnet of Stationary base station (SeNB) belongs to the stationary subnet the router typically sends the payload [1618] and header [1619] without involving the S/P-GW. As part of e.g. the GPRS tunneling protocol the Stationary base station (SeNB) typically removes the header H3 [1619] and sends payload data D3 [1620] to mobile station functionality (tUE) [1603]. Mobile station functionality (tUE) sends the payload data D3, which typically comprises, as above, header H2 [1622] having the designated address of Base station functionality (TeNB) [1602] and payload data D2 [1621], to Base station functionality (TeNB). Base station functionality (TeNB) receives H2[1622] and D2 [1621] and as part of the GPRS protocol removes the header H2[1622] and sends the payload data D2[1621] to mobile station MS[1601]. Mobile station MS [1601] receives payload data which as above, typically includes the original header H1[1624] and payload data D1 [1623] that was originally sent from the Server H1[1609] and D1[1608]. In the other direction, the process is similar but in reverse.

Figure 10:
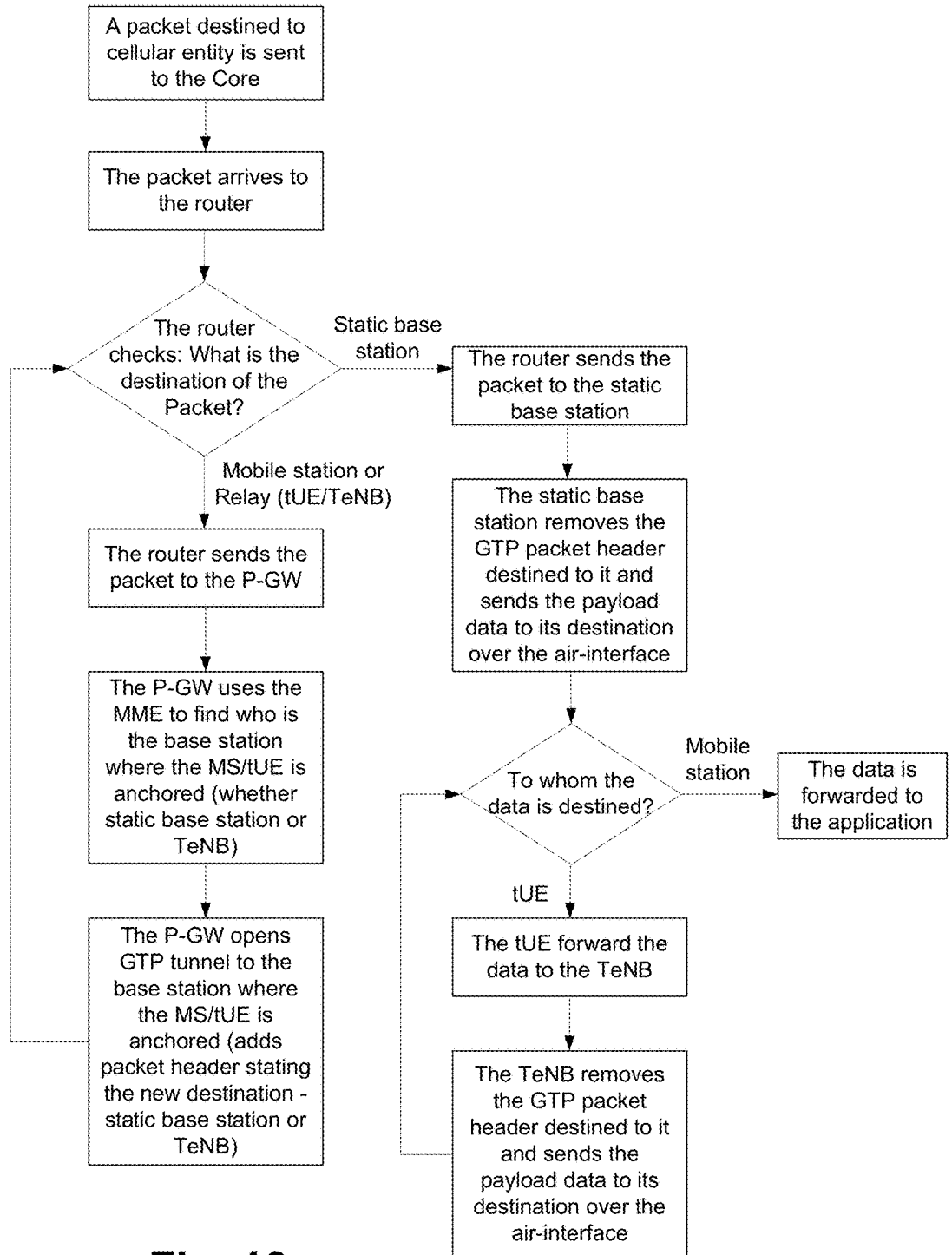
FIG. 10 is a flow chart presenting the process of multi-hop encapsulation of a packet destined to mobile station, through hierarchical cellular network having relays, according to one embodiment of the present invention; wherein the process includes some or all of the illustrated steps, suitably ordered e.g. as shown.

FIG. 10 is a generally self-explanatory flow chart presenting a process of multi-hop encapsulation of a packet destined to mobile station, through hierarchical cellular network having relays, according to one embodiment of present invention. The process may include some or all of the illustrated steps, suitably ordered e.g. as shown.

Figure 11:
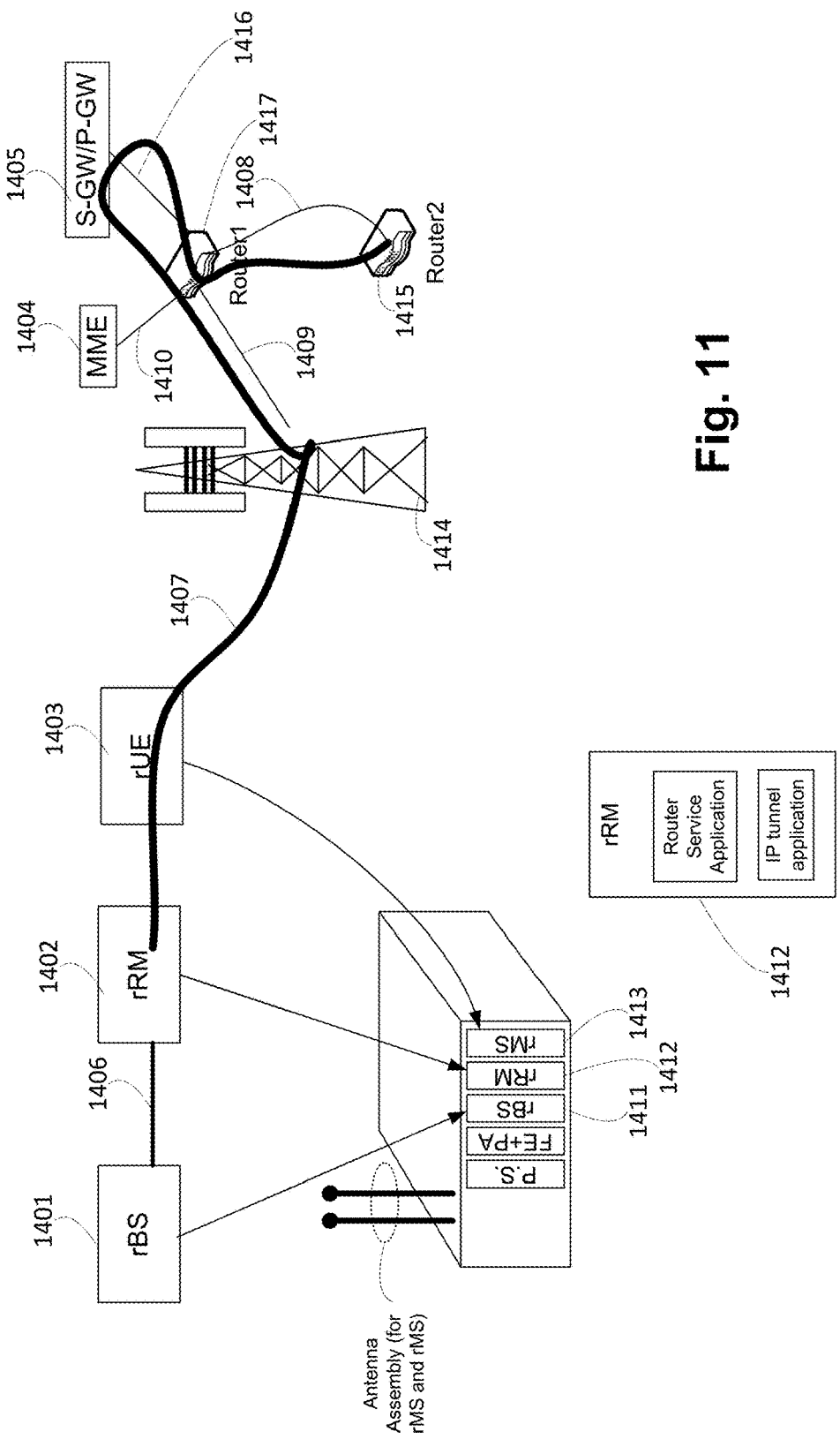
FIG. 11 illustrates another example architecture suitable for encapsulation of data en route through relay, stationary base station and core network which employs another standard tunneling protocol, such as GRE defined by RFC 2784, for tunneling both control plain data and user plain data.

FIG. 11 illustrates another example architecture suitable for encapsulation of data en route through relay, stationary base station and core network which employs another standard tunneling protocol, such as GRE defined by RFC 2784, for tunneling both control plain data and user plain data. In the illustrated example, relay resource manager [1402,1412] is running a router application and IP tunnel application. The relay resource manager rRM [1402] connects two otherwise disconnected networks: a mobile station network which the relay resource manager rRM [1402,1412] communicates with e.g. via a wireless network dongle such as an LTE modem [1403, 1413] e.g. via a USB and AT commands interface, and a relayed base-station network with which the relay resource manager (rRM) communicates using a standard Ethernet link [1406]. Each relayed base station typically has its own static ip address. The Router1 [1417] is configured to send every packet whose designated address is Base station functionality rBS, to Router2. Relay resource manager (rRM) [1402]'s internal router is configured to send all packets whose designated address belongs to the internal EPC network address, through Router2.

On startup, the relay resource manager (rRM) typically couples the mobile station functionality (rUE) [1413,1403] to the network. The mobile station functionality (rUE) is authenticated and assigned an IP address which belongs to the Mobile station network. Next, relay resource manager (rRM) [1402] connects to Router2 [1415] e.g. using standard Mobile station communication over a standard packet switch core such as LTE EPC: base station (e.g. eNB)[1414], MME[1404] and S-GW/P-GW[1405]. relay resource manager (rRM) [1402] sets up a tunnel [1407] such as a GRE tunnel. The tunnel is used to carry IP packets of the relayed base station by delivering packets with the IP address/es of the mobile stations. The Router2 [1415] may be configured in advance in order to be able to create a tunnel for each request of the relay resource manager (rRM). This may be accomplished e.g. by setting a sticky IP (e.g. constant IP address for each connection) for each mobile station functionality (rUE) and saving those IP address in Router2 as tunneling remote address/es.

Once the tunnel [1407] has been established, all packet data, travelling from base station functionality rBS [1401] to the EPC core elements and from EPC core elements to base station functionality (rBS), are transparently tunneled over a mobile station network, e.g. over GRE tunnel [1407]; through link [1406] between the base station functionality (rBS) and relay resource manager (rRM) and link [1408] between the Routers. The tunnel is typically transparent to handovers of the mobile station functionality (rUE) [1403] from one base station to another because the tunnel is handled by a lower IP layer of the mobile station networks. Although the illustrated example is described with reference to GRE tunneling protocol by way of example, for clarity, it is appreciated that the mechanism may be used mutatis mutandis by other tunneling protocols such as but not limited to GTP and IPSEC.

Figure 12:
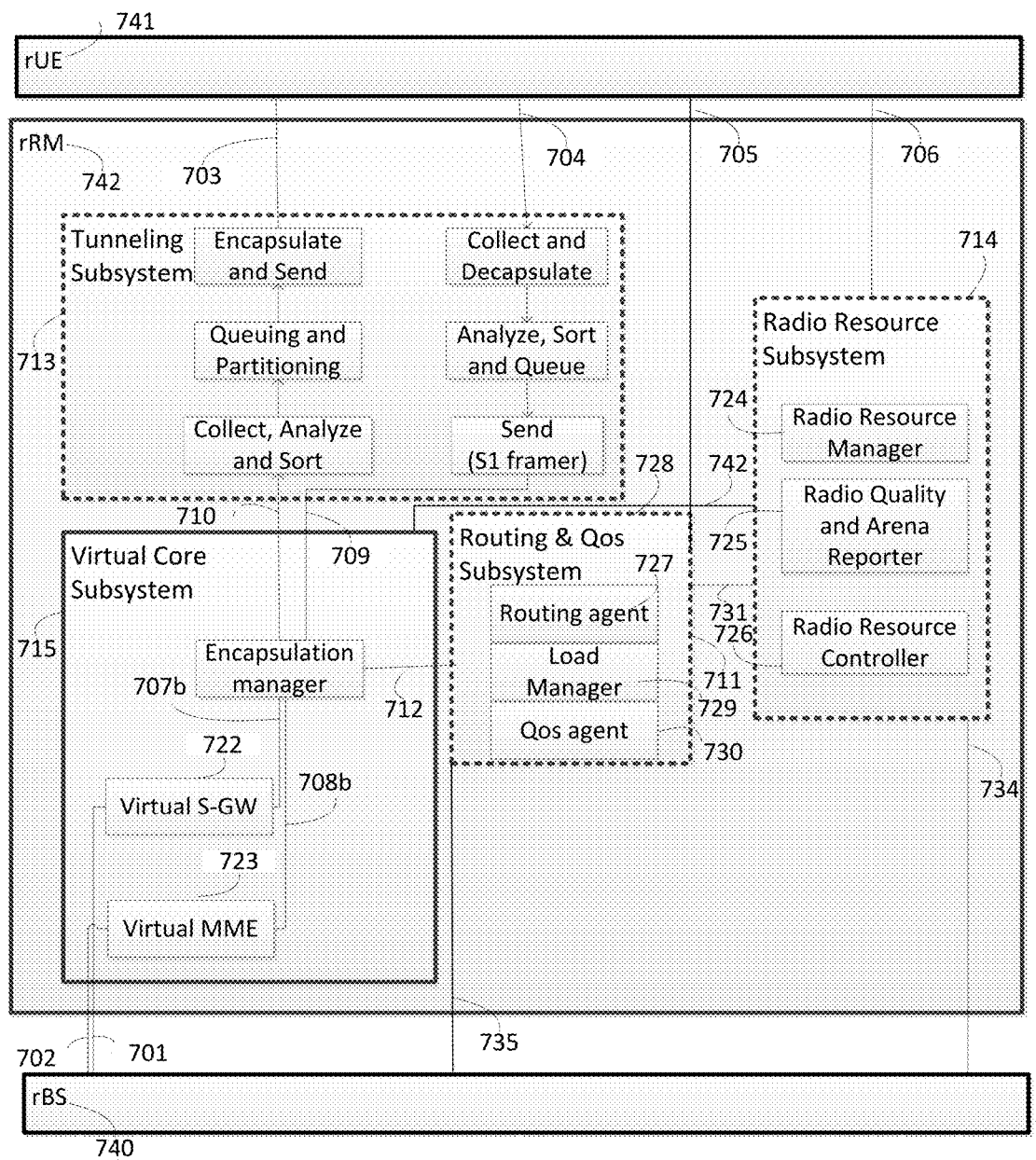
FIG. 12 is a simplified block diagram illustration of a relay resource manager (rRM) of a relay according to an embodiment of the present invention.

FIG. 12 illustrates a relay resource manager (rRM) of a relay, according to an embodiment of the invention. As shown, the relay resource manager comprises some or all of: a Tunneling subsystem [713], Radio Resource subsystem [714] Virtual core subsystem [715] and Routing and QoS Subsystem [728], suitably coupled e.g. as shown.

The tunneling subsystem is operative for encapsulating and de-capsulating of user plane and control plane payloads over user plane bearers according to different priorities and sending the de-capsulated user plane and control plane payloads to entities in the core such as but not limited to any of: mobility management entity e.g. MME, gateways, and application servers. The tunneling subsystem typically interfaces [703, 704] with the mobile station functionality rUE [741] e.g. over a standard IP stack.

The Virtual core subsystem typically constitutes the gateway between the core (stationary) on the one hand, and various resource management subsystems and the base station functionality rBS [740] on the other hand. The Virtual core subsystem may communicate with the base station functionality rBS [740] or core (of the static network) e.g. using standard S1-MME [702,708b,709,710] and S1-U [701,707b,709,710] or proprietary management and control (M&C) over IP interface [701,707b,709,710] with the base station functionality rBS [740] and remote core. The Virtual core subsystem may send all or any of the S1-MME, S1-U, M&C messages to the core optionally through the Tunneling Subsystem [713].

In addition, the Encapsulation manager function of the Virtual core subsystem [715] may optionally include functionality for exchanging information between the relay resource manager rRM that the Virtual core subsystem resides within [742] and: (1) another relay resource manager located inside another relay, and/or (2) Relay/s Server located as part of the static network. The Virtual S-GW [722] and Virtual MME [723] may have corresponding standard S-GW and MME interfaces with the base station functionality rBS [740] accordingly. If a remote core is used by the relay, the Virtual S-GW [722] and Virtual MME [723] may emulate these core functions as proxies so that the base station functionality rBS [740] works smoothly and seamlessly despite remoteness of the core.

The Routing & QoS subsystem [728] may comprise some or all of a routing agent [727], Load manager [729] and QoS Agent [730]. Routing & QoS subsystem [728] communicates with the mobile station functionality (rMS) [741] e.g. using AT Commands or any suitable proprietary interface [705]. Routing & QoS subsystem [728] communicates with the base station functionality rBS e.g. using the M&C interface [735]. Using the M&C interface the Routing and QOS subsystem may command a change in various parameters in the base station functionality rBS [740] such as PLMN, and/or may command the base station functionality rBS [740] to initiate a handover mechanism of an attached mobile station. Using the mobile station functionality (rMS) [741] interface [705] the Routing and QoS subsystem [728] may receive radio measurements of served base stations or neighboring base stations, and may send fake radio measurements to the mobile station functionality (rMS) [741] that the mobile station functionality may send to its serving base station in order to intervene with the handover mechanism. Routing and QoS subsystem [728] may register to specific access point names (APN) and/or create additional bearers.

The Load manager [729] is operative for balancing traffic loads between different relays. Load manager [729] may perform actions such as but not limited to: indicating other relay resource manager elements such as but not limited to any or all of: Radio Resource Subsystem [714], Routing agent [727], QoS agent [730] or Encapsulation manager (block of the Virtual Core Subsystem [715]) or mobile station functionality [741] or base station functionality rBS [740] or mobility management entity MME of remote core (of the static network or) that which current site loaded. Load manager [729] may also command the routing agent to try to change topology in order to gain more bandwidth (at the backhauling link), or to request that additional bandwidth be assigned to the mobile station functionality (rMS) for the backhauling link from the mobility management entity MME of remote core.

The QOS agent [730] is operative for creating bearers according to the current attached mobile stations and their bandwidth requests in case there is a need for an additional bearer due to the multi-hop mechanism.

The Radio Resource Subsystem [714] may comprise some or all of: Radio resource manager [724], Radio Quality and Arena Reporter [725] and Radio Resource Controller [726]. The radio resource subsystem [714] is operative for reducing interference between: (1) relay's access links which may be sent and received by the base station functionality rBS [740]) and relay's backhauling links which may be sent and received by the rUE (rMS) [740]; (2) relay's access links and other relays' access links; and (3) relay backhauling links and other relays' backhauling links. The Radio resource controller [726] is operative for controlling different radio resources of the mobile station functionality rUE [741] and of base station functionality rBS [740] e.g some or all of: lower base station functionality transmission power, blanking particular base station functionality resource blocks/subframe/s, request for mobile station functionality uplink grant, changing center frequency, changing bandwidth.

The Radio Quality and Arena Reporter [725] may be operative for gathering a radio measurement report indicating received power reports of the base station functionality rBS [740] and base station functionality rBS's neighboring base stations from the connected mobile stations reporting to the base station functionality rBS [740] and from the mobile station functionality rUE [741]. The radio measurement report may indicate one or more of the mobile station functionality's serving base station's radio measurements; and/or radio measurements of mobile station functionality rUE [741]'s active set, e.g. list of neighboring base stations that mobile station functionality rUE [741] is operative to measure periodically. The Radio Resource Subsystem sends the measurement report through the interface to the Virtual Core subsystem [742], typically using the encapsulation manager, to radio resource subsystems of other relays' relay resource managers as a radio quality report. This radio quality report may be relevant for distributed radio resource management mechanisms and/or for decisions relevant to the routing agent.

The radio resource manager may receive radio quality reports from the radio resource manager's local Radio quality and arena reporter [725] and from neighboring relays' Radio quality and arena reporters. The radio resource manager may compute the level of interference between the various stations, e.g. of relays and optionally of the static network. The radio resource manager may also provide radio resource configuration recommendations to its local radio resource controller [726] and/or to its neighboring relays' radio resource controller/s through interface [742] and using the encapsulation manager of the Virtual core subsystem [715].

The Radio resource manager [714] can optionally communicate in interface [706] e.g. using AT Commands or other proprietary protocol with the mobile station functionality rUE [741]. The Radio resource manager can further optionally communicate in interface [734] e.g. using M&C protocol with the base station functionality rBS [740]. The Radio resource manager can further optionally communicate with other relays' radio resource subsystems through interface [742] e.g. using the virtual core subsystem [715] Encapsulation manager.

Tunneling Subsystem [713], Routing & QoS Subsystem [728] and Radio Resource Subsystem [714] are optional subsystems of the relay resource manager rRM. All or any subset of these subsystems can be added to the relay resource manager rRM by need.

Figure 13:
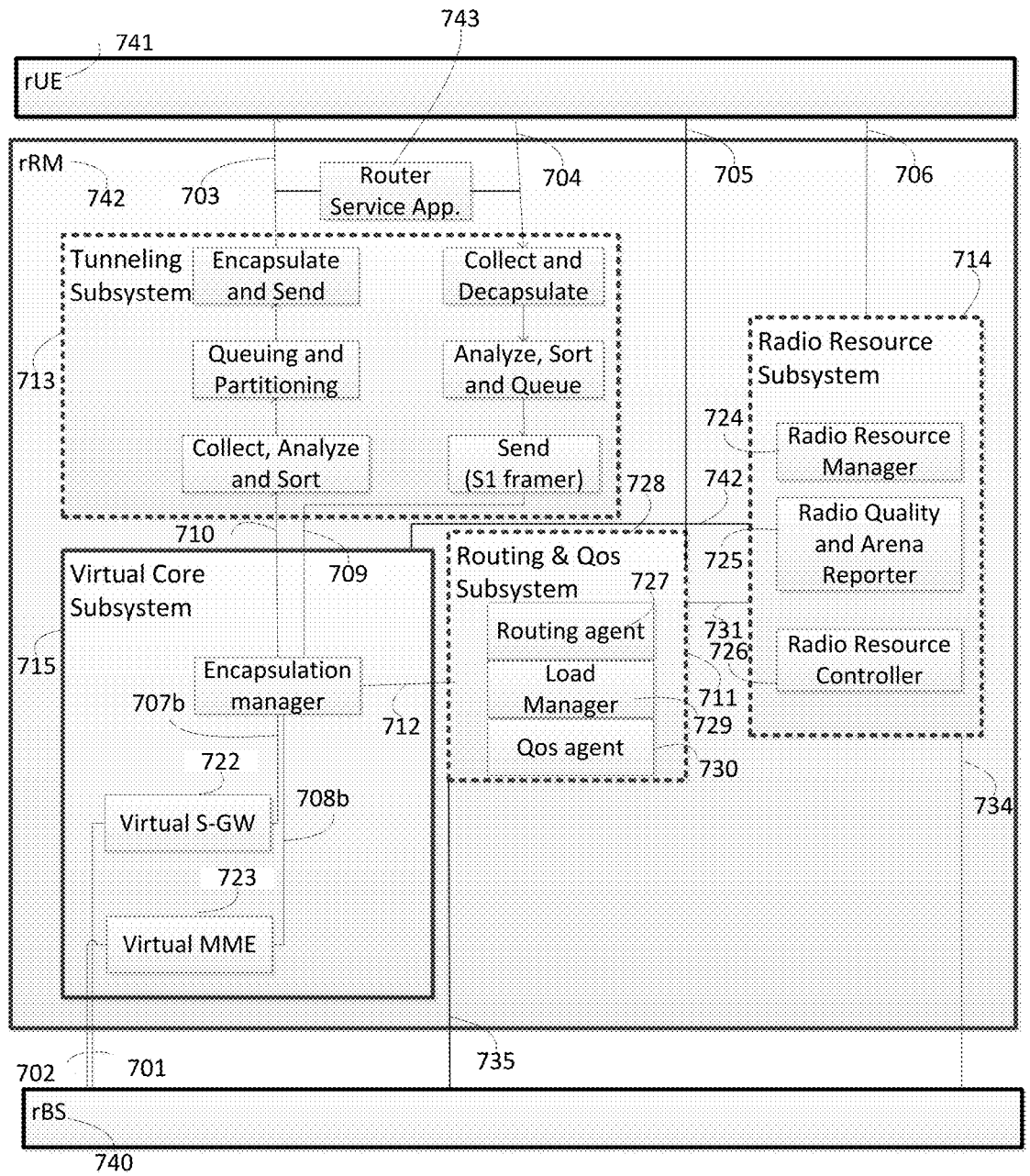
FIG. 13 is a simplified block diagram illustration of a relay resource manager (rRM) of relay that includes a router service application according to an embodiment of the present invention.

FIG. 13 illustrates a relay resource manager (rRM) [742] of a relay that is similar to that described above with reference to FIG. 12 except that the relay of FIG. 13 includes a router service application [743] such as that illustrated in FIG. 11.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are if they so desire able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

Conversely, features of the invention, including method steps, which are described for brevity in the context of a single embodiment or in a certain order may be provided separately or in any suitable subcombination or in a different order. "e.g." is used herein in the sense of a specific example which is not intended to be limiting. Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and steps therewithin, and functionalities described or illustrated as methods and steps therewithin can also be provided as systems and sub-units thereof. The scale used to illustrate various elements in the drawings is merely exemplary and/or appropriate for clarity of presentation and is not intended to be limiting.

The invention claimed is:

1. A dynamic hierarchical cellular system implementing multi-hop encapsulation, the system comprising:

a core including a mobility management entity (MME) and an Internet Protocol (IP) connectivity gateway interfacing therewith;

at least one static base station coupled to the mobility management entity and the IP connectivity gateway in the core;

at least one individual moving relay coupled to at least one individual static base station and including an individual mobile station functionality and an individual base station functionality; and at least one mobile station coupled to at least one of the static base station and the at least one moving relay, wherein the core comprises an encapsulating router, whose routing operations encapsulate messages to and from the at least one mobile station, without resorting to use of a multi-protocol label switching (MPLS) tunneling protocol, the encapsulating router is coupled to the IP connectivity gateway, to the mobility management entity and to the individual static base station via which the individual moving relay connects to the core, and the router is operative for re-routing, to the gateway, at least packets designated to an IP address of one of the at least one moving relay, the system is configured to implement multi-hop encapsulation, such that, for at least one message destined for an individual base station functionality, the individual base station functionality's header is encapsulated within the individual mobile station functionality's header, so as to allow the message to be routed by the router to the individual base station functionality, via the individual mobile station functionality, the system is configured to support multiple relay scenarios with dynamic topology, in which relay connections vary over time, in that at least one mobile station functionality, user entity (UE), with plural potential connections to plural nodes respectively, is provided in the at least one relay, with IP level relayed information regarding various of said plural potential connections via the at least one relay that said UE is currently connected to, the plural nodes including at least one of (a) base stations and (b) relay nodes' base station functionalities, and decision making functionality is provided to:
dynamically derive from said information, a correct IP routing over multiple relays, from among multiple alternative routes available for a one to one entity connection, which will connect said UE to a given final destination via a suitable number of available relay nodes, given a current topology of said available relay nodes, and dynamically select a relay for the UE to be served by, from among said plural potential connections, accordingly.

2. The system according to claim 1, wherein the router is configured to:
if an IP address of a destination in a header of a packet indicates one of a mobile station destination and a relay destination, route the packet to the IP connectivity gateway, and
if an IP address of a destination in a header of a packet indicates a static base station, route the packet to the static base station.

3. The system according to claim 1, wherein at least one pair of IP addresses of at least one mobile station functionality and base station functionality have a common portion which is recognized by the router.

4. The system according to claim 1, wherein all mobile station functionalities served by the core have IP addresses with a common portion which is recognized by the router.

5. The system according to claim 1, wherein the core is configured to:
assign identical IP addresses to the at least one base station functionality and the at least one mobile station functionality, and
assign different first and second ports to the respective at least one base station functionality and at least one mobile station functionality.

6. The system according to claim 1, wherein at least one pair of IP addresses of a base station functionality and a mobile station functionality respectively includes:
a first portion, common to both IP addresses in the pair, and common to the base station functionality and the mobile station functionality, and
a second portion, which differs between the IP addresses in the pair and represents uniqueness of each of the base station functionality and the mobile station functionality, respectively.

7. The system according to claim 1, further comprising an additional router in the at least one relay that is configured to, upon receipt of a message from a co-located base station functionality, send to the additional encapsulating router in the core the message with a header indicating that the message was sent by the additional router.

8. The system according to claim 7, wherein the at least one moving relay has a relay resource manager operative to, when the at least one moving relay joins a network served by the core, instruct the additional router to store an association between the at least one moving relay's individual base station functionality and the at least one moving relay's co-located mobile station functionality.

9. The system according to claim 1, wherein the router is operative to route information to the individual base station functionality, via the individual mobile station functionality.

10. The system according to claim 1, wherein the router cooperates with a logical table in the mobility management entity which indicates which base station serves each respective mobile station.

11. The system according to claim 1, wherein as each individual relay of the at least one moving relay enters a network served by the core, the respective individual relay's mobile station functionality is assigned an IP address which the router is pre-configured to identify as an IP address of the individual relay's individual base station functionality.

12. The system according to claim 1, wherein
the core includes a core network, and
all mobile station functionalities in relays served by the core form a subnet of the core network.

13. The system according to claim 1, wherein
the core includes a core network, and
all base station functionalities in relays served by the core form a subnet of the core network.

14. The system according to claim 1, wherein the router is operative to route Internet Protocol (IP)-packets arriving from the mobility management entity within the core.

15. The system according to claim 1, wherein all base station functionalities' Internet Protocol (IP) addresses have a common portion which is recognized by the router.

16. The system according to claim 1, wherein
the at least one moving relay includes a first moving relay comprising a radio manager co-located with said individual base station functionality and said individual mobile station functionality,
the individual base station functionality is operative to communicate via antennae with at least one mobile station thereby to define a first radio link therebetween,
said individual base station functionality has a physical connection to its co-located radio manager,
the individual mobile station functionality communicates via antennae with a unit which has base station functionality thereby to define a second radio link,
the radio manager comprises:
a radio resource manager; and
functionality for exchanging information with radio managers included in moving relays other than said first moving relay, and
the radio resource manager is configured to use the exchanged information to select, for at least one individual mobile station seeking to be served, one of: a static base station; and a base station functionality, to which to connect the individual mobile station in order to provide cellular communication services thereto.

17. A method for internet protocol (IP) based cellular communication in an IP based cellular communication system comprising a plurality of base stations and a cellular communication system core connected to each of the plurality of base stations and including an IP connectivity gateway operative to receive at least one packet having an IP-address designating a node in the cellular communication system, to add thereto a header of a base station serving the node, and to forward the at least one packet with the header to a router, the method comprising:
providing at least one moving relay having an individual mobile station functionality and an individual base station functionality which is addressed by the cellular communication system core using the individual mobile station functionality's IP address; and
providing a router coupled to the gateway, configured to recognize packets for the individual base station as designated to a mobile station and operative for routing, packets received from the gateway, as follows: packets whose IP address is any one of the plurality of base stations, are routed to the base stations; and at least one packet designated to an IP address of a mobile station is routed back to the gateway, wherein
the router is operative to receive the packets from an IP connectivity gateway at the cellular communication system core which is connected to each of the plurality of base stations,
at least one of the packets includes:
an IP-address designating a node in the cellular communication system, and
a header, added by the gateway and recognized by the router, of a base station serving the node,
the method is configured to support multiple relay scenarios with dynamic topology, in which relay connections vary over time, in that the at least one mobile station functionality, user entity (UE), with plural potential connections to plural nodes respectively, is provided in the at least one relay, with IP level relayed information regarding various of said plural potential connections via the at least one relay that said UE is currently connected to, the plural nodes including at least one of (a) base stations and (b) relay nodes' base station functionalities, and
decision making functionality is provided to:
dynamically derive from said information, a correct IP routing over multiple relays, from among multiple alternative routes available for a one to one entity connection, which will connect said UE to a given final destination via a suitable number of available relay nodes, given a current topology of said available relay nodes, and dynamically select a relay for the UE to be served by, from among said plural potential connections, accordingly.

18. The method according to claim 17, further comprising: when the cellular communication system core receives an individual packet having an IP-address designating a mobile station served by a peripheral base station located at a location which enables communication with a central base station, from among the plurality of base stations connected to the cellular communication system core, performing the following steps:

at the gateway, adding a header of the peripheral base station and forwarding the individual packet with the header of the peripheral base station to the router;

at the router, routing the individual packet, since its outermost IP address is recognized as designated to a mobile station, back to the gateway;

at the gateway, adding a header of the central base station and forwarding the individual packet with the header of the central base station to the router;

at the router, routing the individual packet, since its outermost IP address is one of the plurality of base stations, to the central base station;

at the central base station, routing the individual packet, since its outermost IP address is the peripheral base station, to the peripheral base station; and at the peripheral base station, routing the individual packet to the mobile station designated in the individual packet's innermost IP address.

19. The method according to claim 17, wherein the using the individual mobile station functionality's IP address is effected by using a National Address Translation (NAT) application.

20. The method according to claim 17, wherein the using of the individual mobile station functionality's IP address is effected by sharing one Internet Protocol version 6 (IPv6) network prefix and using a stateless address auto-configuration in the IP address allocation of the individual mobile station functionality.

21. The method according to claim 17, wherein the at least one moving relay includes a first moving relay comprising a radio manager co-located with the individual base station functionality and the individual mobile station functionality, the individual base station functionality is operative to communicate via antennae with at least one mobile station thereby to define a first radio link therebetween, the individual base station functionality has a physical connection to its co-located radio manager, the individual mobile station functionality communicates via antennae with a unit which has base station functionality thereby to define a second radio link, the radio manager comprises:

a radio resource manager; and functionality for exchanging information with radio managers included in moving relays other than said first moving relay, and the radio resource manager is configured to use the exchanged information to select, for at least one individual mobile station seeking to be served, one of: a static base station; and a base station functionality, to which to connect the individual mobile station in order to provide cellular communication services thereto.

22. An Internet Protocol (IP)-based cellular communication system operative in conjunction with a moving relay, the system comprising:

an IP connectivity gateway coupled to a network router and to a mobility management entity; and a router configured to:

route, to the gateway, at least one packet designated to an IP address of at least one moving relay, wherein the router is configured to use a tunneling protocol other than a multi-protocol label switching (MPLS) tunneling protocol, the at least one moving relay includes a first moving relay comprising base station functionality, a radio manager and mobile station functionality, all co-located, the base station functionality is operative to communicate via antennae with at least one mobile station thereby defining a first radio link there between, said base station functionality has a physical connection to the co-located radio manager, the mobile station functionality communicates via antennae with a unit which has base station functionality thereby to define a second radio link, the radio manager comprises:

a radio resource manager, and functionality for exchanging information with radio managers included in moving relays other than the first moving relay, the radio manager is configured to use the exchanged information to select, for at least one individual mobile station which seeks to be served by establishing a standard connection, one of: a static base station; and a base station functionality, to which to connect the individual mobile station in order to provide cellular communication services thereto, the system is configured to support multiple relay scenarios with dynamic topology, in which relay connections vary over time, in that at least one mobile station functionality, user entity (UE), with plural potential connections to plural nodes respectively, is provided in the at least one relay, with IP level relayed information regarding various of said plural potential connections via the at least one relay that said UE is currently connected to, the plural nodes including at least one of (a) base stations and (b) relay nodes' base station functionalities, and decision making functionality is provided to:

dynamically derive from said information, a correct IP routing over multiple relays, from among multiple alternative routes available for a one to one entity connection, which will connect said UE to a given final destination via a suitable number of available relay nodes, given a current topology of said available relay nodes, and dynamically select a relay for the UE to be served by, from among said plural potential connections, accordingly.

23. The system according to claim 22, wherein packets are bounced back to the IP connectivity gateway by the router.

24. The system according to claim 23, wherein said MME comprises a single MME configured to store at least (i) IP addresses of a plurality of stationary relays, (ii) IP addresses of mobile relays and the IP address of a linked relay that each individual mobile relay is anchored to, and (iii) IP addresses of mobile stations and the IP address of a linked relay that each individual mobile station is anchored to.

25. The system according to claim 22, wherein packets are bounced back to the gateway, which is a Packet Data Network and Serving Gateway (P/S-GW), internally in the IP connectivity gateway by virtue of the IP connectivity gateway recognizing a destination IP address as its own address.

26. The system according to claim 22, wherein the gateway is aware of all user entities and mobile station functionalities in addresses of the at least one first moving relay.

27. The system according to claim 22, wherein
said router is configured to allow for a varying number of layers of encapsulations by the gateway, and
said varying corresponds to a number of relay layers a packet needs to go through to reach said final destination, given the current topology.

28. The system according to claim 22, further comprising a mobile management entity (MME) configured to store at least (i) IP addresses of a plurality of stationary relays, (ii) IP addresses of mobile relays and the IP address of a linked relay that each individual mobile relay is anchored to, and (iii) IP addresses of mobile stations and the IP address of a linked relay that each individual mobile station is anchored to.

29. The system according to claim 22, wherein the gateway comprises a standard legacy Serving and Packet Data Network Gateway (S/P-GW).

\* \* \* \* \*